(12) United States Patent
Kupratis et al.

(10) Patent No.: US 10,794,292 B2
(45) Date of Patent: Oct. 6, 2020

(54) GEARED TURBOFAN GAS TURBINE ENGINE ARCHITECTURE

(71) Applicant: UNITED TECHNOLOGIES CORPORATION, Farmington, CT (US)

(72) Inventors: Daniel Bernard Kupratis, Wallingford, CT (US); Frederick M. Schwarz, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 197 days.

(21) Appl. No.: 15/420,221

(22) Filed: Jan. 31, 2017

(65) Prior Publication Data

US 2018/0003112 A1 Jan. 4, 2018

Related U.S. Application Data

(63) Continuation of application No. 14/662,459, filed on Mar. 19, 2015, which is a continuation-in-part of
(Continued)

(51) Int. Cl.
*F02C 7/36* (2006.01)
*F02K 3/04* (2006.01)
(Continued)

(52) U.S. Cl.
CPC .............. *F02C 7/36* (2013.01); *F01D 25/162* (2013.01); *F02C 3/107* (2013.01); *F02C 7/06* (2013.01);
(Continued)

(58) Field of Classification Search
CPC .. F02C 3/067; F02C 3/10; F02C 3/113; F02C 7/06; F02C 7/36; F05D 2240/50;
(Continued)

(56) References Cited

U.S. PATENT DOCUMENTS 2,258,792 A 4/1941 New
2,936,655 A 5/1960 Peterson et al.
(Continued)

FOREIGN PATENT DOCUMENTS

EP 0791383 8/1997
EP 1142850 10/2001
(Continued)

OTHER PUBLICATIONS

Mattingly, Jack; Elements of Gas Turbine Propulsion; 1996 McGraw Hill; pp. 726-727.*
(Continued)

*Primary Examiner* — Andrew H Nguyen
(74) *Attorney, Agent, or Firm* — Carlson, Gaskey & Olds, P.C.

(57) ABSTRACT

A gas turbine engine typically includes a fan section, a compressor section, a combustor section and a turbine section. A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a speed different than the turbine section such that both the turbine section and the fan section can rotate at closer to optimal speeds providing increased performance attributes and performance by desirable combinations of the disclosed features of the various components of the described and disclosed gas turbine engine.

14 Claims, 13 Drawing Sheets

Related U.S. Application Data application No. 13/645,773, filed on Oct. 5, 2012, now abandoned, which is a continuation-in-part of application No. 13/363,154, filed on Jan. 31, 2012, now abandoned.

(60) Provisional application No. 61/653,794, filed on May 31, 2012.

(51) Int. Cl.
    *F02K 3/072*     (2006.01)
    *F02C 3/107*     (2006.01)
    *F02C 7/06*     (2006.01)
    *F01D 25/16*     (2006.01)

(52) U.S. Cl.
    CPC .......... *F02K 3/072* (2013.01); *F05D 2240/12* (2013.01); *F05D 2240/129* (2013.01); *F05D 2260/40311* (2013.01); *Y02T 50/671* (2013.01)

(58) Field of Classification Search
    CPC ........ F05D 2260/40; F02K 3/072; F01D 1/26; F01D 5/026; F01D 5/06; F01D 25/16
    See application file for complete search history.

(56) References Cited

U.S. PATENT DOCUMENTS

| | | | |
|---|---|---|---|
| 3,021,731 A | 2/1962 | Stoeckicht | |
| 3,194,487 A | 7/1965 | Tyler et al. | |
| 3,250,512 A | 5/1966 | Petrie | |
| 3,287,906 A | 11/1966 | McCormick | |
| 3,352,178 A | 11/1967 | Lindgren et al. | |
| 3,412,560 A | 11/1968 | Gaubatz | |
| 3,527,054 A | 9/1970 | Hemsworth | |
| 3,747,343 A * | 7/1973 | Rosen | F02K 3/06 415/119 |
| 3,754,484 A | 8/1973 | Roberts | |
| 3,820,719 A | 6/1974 | Clark | |
| 3,861,139 A | 1/1975 | Jones | |
| 3,892,358 A | 7/1975 | Gisslen | |
| 3,932,058 A | 1/1976 | Harner et al. | |
| 3,935,558 A | 1/1976 | Miller et al. | |
| 3,988,889 A | 11/1976 | Chamay et al. | |
| 4,130,872 A | 12/1978 | Harloff | |
| 4,304,522 A | 12/1981 | Newland | |
| 4,478,551 A | 10/1984 | Honeycutt, Jr. et al. | |
| 4,649,114 A | 3/1987 | Miltenburger et al. | |
| 4,693,616 A | 9/1987 | Rohra et al. | |
| 4,696,156 A | 9/1987 | Burr et al. | |
| 4,916,894 A | 4/1990 | Adamson et al. | |
| 4,979,362 A | 12/1990 | Vershure, Jr. | |
| 5,102,379 A | 4/1992 | Pagluica et al. | |
| 5,141,400 A | 8/1992 | Murphy et al. | |
| 5,317,877 A | 6/1994 | Stuart | |
| 5,433,674 A | 7/1995 | Sheridan | |
| 5,447,411 A | 9/1995 | Curley et al. | |
| 5,466,198 A | 11/1995 | McKibbin et al. | |
| 5,524,847 A | 6/1996 | Brodell et al. | |
| 5,677,060 A | 10/1997 | Terentieva et al. | |
| 5,778,659 A | 7/1998 | Duesler et al. | |
| 5,857,836 A | 1/1999 | Stickler et al. | |
| 5,915,917 A | 6/1999 | Eveker et al. | |
| 5,975,841 A | 11/1999 | Lindemuth et al. | |
| 5,985,470 A | 11/1999 | Spitsberg et al. | |
| 6,223,616 B1 | 5/2001 | Sheridan | |
| 6,315,815 B1 | 11/2001 | Spadaccini et al. | |
| 6,318,070 B1 | 11/2001 | Rey et al. | |
| 6,387,456 B1 | 5/2002 | Eaton, Jr. et al. | |
| 6,517,341 B1 | 2/2003 | Brun et al. | |
| 6,607,165 B1 | 8/2003 | Manteiga et al. | |
| 6,709,492 B1 | 3/2004 | Spadaccini et al. | |
| 6,814,541 B2 | 11/2004 | Evans et al. | |
| 7,021,042 B2 | 4/2006 | Law | |
| 7,219,490 B2 * | 5/2007 | Dev | F02C 3/045 60/226.1 |
| 7,328,580 B2 | 2/2008 | Lee et al. | |
| 7,374,403 B2 | 5/2008 | Decker et al. | |
| 7,591,754 B2 | 9/2009 | Duong et al. | |
| 7,632,064 B2 | 12/2009 | Somanath et al. | |
| 7,694,505 B2 | 4/2010 | Schilling | |
| 7,806,651 B2 | 10/2010 | Kennepohl et al. | |
| 7,824,305 B2 | 11/2010 | Duong et al. | |
| 7,828,682 B2 | 11/2010 | Smook | |
| 7,926,260 B2 | 4/2011 | Sheridan et al. | |
| 7,997,868 B1 | 8/2011 | Liang et al. | |
| 8,205,432 B2 | 6/2012 | Sheridan | |
| 8,297,916 B1 | 10/2012 | McCune et al. | |
| 8,834,099 B1 | 9/2014 | Topol et al. | |
| 9,133,729 B1 | 9/2015 | McCune et al. | |
| 9,297,917 B2 | 3/2016 | Mah et al. | |
| 9,631,558 B2 | 4/2017 | McCune et al. | |
| 2005/0279100 A1 * | 12/2005 | Graziosi | F01D 5/145 60/772 |
| 2006/0130456 A1 * | 6/2006 | Suciu | F01D 5/066 60/226.1 |
| 2006/0179818 A1 * | 8/2006 | Merchant | F02K 3/04 60/226.1 |
| 2007/0265133 A1 | 11/2007 | Smook | |
| 2008/0003096 A1 | 1/2008 | Kohli et al. | |
| 2008/0098714 A1 | 5/2008 | Orlando et al. | |
| 2008/0317588 A1 | 12/2008 | Grabowski et al. | |
| 2009/0056343 A1 | 3/2009 | Suciu et al. | |
| 2009/0288384 A1 * | 11/2009 | Granitz | F01D 25/20 60/39.08 |
| 2010/0105516 A1 | 4/2010 | Sheridan | |
| 2010/0148396 A1 | 6/2010 | Xie et al. | |
| 2010/0218483 A1 | 9/2010 | Smith | |
| 2010/0331139 A1 | 12/2010 | McCune | |
| 2011/0081237 A1 | 4/2011 | Durocher et al. | |
| 2011/0159797 A1 | 6/2011 | Beltman et al. | |
| 2011/0293423 A1 | 12/2011 | Bunker et al. | |
| 2012/0124964 A1 | 5/2012 | Hasel et al. | |
| 2012/0291449 A1 | 11/2012 | Adams | |
| 2013/0192200 A1 | 8/2013 | Kupratis et al. | |
| 2016/0032826 A1 | 2/2016 | Rued | |

FOREIGN PATENT DOCUMENTS

| | | |
|---|---|---|
| EP | 1703085 | 9/2006 |
| EP | 2071139 A2 | 6/2009 |
| EP | 2551489 | 1/2013 |
| EP | 3070315 A1 | 9/2016 |
| EP | 3070316 A1 | 9/2016 |
| FR | 2912181 | 8/2008 |
| GB | 1516041 | 6/1978 |
| GB | 2041090 | 9/1980 |
| GB | 2426792 | 12/2006 |
| WO | 2007038674 | 4/2007 |

OTHER PUBLICATIONS

Petition for Inter Partes Review of U.S. Pat. No. 8,899,915. *General Electric Company*, Petitioner, v. *United Technologies Corporation*, Patent Owner. Filed Dec. 21, 2016.

Kurzke, J., Preliminary Design, Aero-Engine Design: From State of the Art Turbofans Towards Innovative Architectures. Mar. 3-7, 2008. pp. 1-72.

Willis, W.S., Quiet Clean Short-Haul Experimental Engine (QCSEE) Final Report. Aug. 1979.

Leckie, F.A. and Dal Bello, D.J. (2009). Strength and stiffness of engineering systems. Mechanical Engineering Series. Springer. pp. 1-3 (improperly identified as Bauchau on IPR Petition (filed on IDS dated Feb. 2016).

Declaration of Raymond Drago. In re U.S. Pat. No. 8,899,915 under 37 C.F.R. § 1.68. Executed Dec. 9, 2016. pp. 1-38.

Thulin, R.D. et al., NASA CR-165608, Energy Efficient Engine, High-Pressure Turbine Detailed Design Report. Jan. 1982.

Patent Owner United Technologies Corporation's Preliminary Response in U.S. Pat. No. 8,899,915. *General Electric Company*, Petitioner,

(56) References Cited

OTHER PUBLICATIONS v. *United Technologies Corporation*, Patent Owner. Filed Dec. 21, 2016.

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida. pp. 145-153.

Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.

Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis. pp. 1-60.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case pp. 1-4.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.

Willis, W.S. (1979). Quiet clean short-haul experimental engine (QCSEE) final report. NASA/CR-159473 pp. 1-289.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Ramsden, J.M. (Ed). (1978). The new European airliner. Flight International, 113(3590). Jan. 7, 1978. pp. 39-43.

Angston, L. and Faghri, A. Heat pipe turbine vane cooling. Prepared for Advanced Turbine Systems Annual Program Review. Morgantown, West Virginia. Oct. 17-19, 1995. pp. 3-9.

Oates, G.C. (Ed.) (1989). Aircraft propulsion systems and technology and design. Washington, D.C.: American Institute of Aeronautics, Inc. pp. 341-344.

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc. pp. 145, 355-358.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc. pp. 8-15.

Pyrograf-III Carbon Nanofiber. Product guide. Retrieved Dec. 1, 2015 from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc. Oct. 2004.

Ratna, D. (2009). Handbook of thermoset resins. Shawbury, UK: iSmithers. pp. 187-216.

Wendus, B.E., Stark, D.F., Holler, R.P., and Funkhouser, M.E. (2003). Follow-on technology requirement study for advanced subsonic transport. NASA/CR-2003-212467. pp. 1-37.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Merriam-Webster's collegiate dictionary, 11th Ed. (2009). p. 824.

Merriam-Webster's collegiate dictionary, 10th Ed. (2001). p. 1125-1126.

Hughes, C. (2010). Geared turbofan technology. NASA Environmentally Responsible Aviation Project. Green Aviation Summit. NASA Ames Research Center. Sep. 8-9, 2010. pp. 1-8.

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

Moxon, J. How to save fuel in tomorrow's engines. Flight International. Jul. 30, 1983. 3873(124). pp. 272-273.

File History for U.S. Appl. No. 12/131,876.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.

Gunston, B. (Ed.) (2000). Jane's aero-engines, Issue seven. Coulsdon, Surrey, UK: Jane's Information Group Limited. pp. 510-512.

Ivchenko-Progress D-436. Jane's Aero-engines, Aero-engines—Turbofan. Feb. 8, 2012.

Ivchenko-Progress AI-727M. Jane's Aero-engines, Aero-engines—Turbofan. Nov. 27, 2011.

Ivchenko-Progress D-727. Jane's Aero-engines, Aero-engines—Turbofan. Feb. 7, 2007.

Turbomeca Aubisque. Jane's Aero-engines, Aero-engines—Turbofan. Nov. 2, 2009.

Aviadvigatel D-110. Jane's Aero-engines, Aero-engines—Turbofan. Jun. 1, 2010.

Rolls-Royce M45H. Jane's Aero-engines, Aero-engines—Turbofan. Feb. 24, 2010.

Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.

Middleton, P. (1971). 614: VFW's jet feederliner. Flight International, Nov. 4, 1971. p. 725, 729-732.

Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-33.

Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.

Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.

Baker, R.W. (2000). Membrane technology and applications. New York, NY: McGraw-Hill pp. 87-151.

Cheryan, M. (1998). Ultrafiltration and microfiltration handbook. Lancaster, PA: Tecnomic Publishing Company, Inc. pp. 171-236.

(56) References Cited

OTHER PUBLICATIONS

Seader, J.D. and Henley, E.J. (1998). Separation process principles. New York, NY: John Wiley & Sons, Inc. pp. 122-126 and 764-771.
Spadaccini, L.J., and Huang, H. (2002). On-line fuel deoxygenation for coke suppression. ASME, Jun. 2002. pp. 1-7.
Darrah, S. (1987). Jet fuel deoxygenation. Interim Report for Period Mar. 1987-Jul. 1988. pp. 1-22.
Bucknell, R.L. (1973). Influence of fuels and lubricants on turbine engine design and performance, fuel and lubricant analyses. Final Technical Report, Mar. 1971-Mar. 1973. pp. 1-252.
Hazlett, R.N. (1991). Thermal oxidation stability of aviation turbine fuels. Philadelphia, PA: ASTM. pp. 1-163.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.
Rankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https://www.cgabusinessdesk.com/document/aviation_tech_review.pdf.
Spadaccini, L.J., Sobel, D.R., and Huang, H. (2001). Deposit formation and mitigation in aircraft fuels. Journal of Eng. For Gas Turbine and Power, vol. 123. Oct. 2001. pp. 741-746.
Edwards, T. and Zabarnick, S. (1993). Supercritical fuel deposition mechanisms. Ind. Eng. Chem. Res. vol. 32. 1993. pp. 3117-3122.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.
Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Technical Data. Teflon. WS Hampshire Inc. Retrieved from: http://catalog.wshampshire.com/Asset/psg_teflon_ptfe.pdf.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Edkins, D.P., Hirschkron, R., and Lee, R. (1972). TF34 turbofan quiet engine study. Final Report prepared for NASA. NASA-CR-120914. Jan. 1, 1972. pp. 1-99.
Meyer, A.G. (1988). Transmission development of Textron Lycoming's geared fan engine. Technical Paper. Oct. 1988. pp. 1-12.
Dudley, D.W., Ed. (1962). Gear handbook. New York, NY: McGraw-Hill. pp. 14-17 (TOC, Preface, and Index).
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
Gates, D. Bombardier flies at higher market. Seattle Times.

Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
NASA/TM 2010-216758—Assessment of Aerodynamic Challenges of a Variable-Speed Power Turbine for Large Civil Tilt-Rotor Application, Welch, Aug. 2010.
NASA/TM 2012-217605—Variable-Speed-Power-Turbine Research at Glenn Research Center, Welch, Jul. 2012.
P&W Propulsion Systems Studies, NASA High Speed Research Workshop, May 14-16, 1991.
Design Optimization of a Variable-Speed Power-Turbine, Hendricks, et al., Jul. 2014.
NASA/CR 2012-217424—Variable-Speed Power-Turbine for the Large Civil Tilt Rotor, Suchezky, Feb. 2012.
Architectural Comparison of Advanced Ultra-High Bypass Ratio Turbofans for Medium to Long Range Application, Bijewitz, 2014.
Prior Art Direct Drive Engines.
Energy Efficient Engine High-Pressure Turbine Uncooled Rig Technology Report, NASA CR-16149, Oct. 1981.
Aircraft Engine Design, Second Edition, Jack D. Matingly, pp. 290-292.
Federal Aviation Administration Advisory Circular dated Apr. 13, 2006 on Calibration Test, Endurance Test and Teardown Inspection for Turbine Engine Certification.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
NASA Conference Publication. Quiet, powered-lift propulsion. Cleveland, Ohio. Nov. 14-15, 1978. pp. 1-420.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8). Start p. 32.
Hendricks, E.S. and Tong, M.T. (2012). Performance and weight estimates for an advanced open rotor engine. NASA/TM-2012-217710. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Zalud, T. (1998). Gears put a new spin on turbofan performance. Machine Design, 70(20), p. 104.
Kurzke, J. (2008). Preliminary Design, Aero-engine design: From state of the art turbofans towards innovative architectures. pp. 1-72.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Han, J., Dutta, S., and Ekkad, S.V. (2000). Gas turbine heat transfer and cooling technology. New York, NY: Taylor & Francis. pp. 1-25, 129-157, and 160-249.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.
Declaration of Reza Abhari, Ph.D. In re U.S. Pat. No. 8,844,265. Executed Jun. 28, 2016. pp. 1-91.
Declaration of John Eaton, Ph.D. In re U.S. Pat. No. 8,869,568. Executed Mar. 28, 2016. pp. 1-87.
Declaration of Reza Abhari. In re U.S. Pat. No. 8,695,920. Executed Nov. 30. pp. 1-67.

(56) References Cited

OTHER PUBLICATIONS

Declaration of Reza Abhari. In re U.S. Pat. No. 8,448,895. Executed Nov. 28. pp. 1-81.
Declaration of Reza Abhari. In re U.S. Pat. No. 8,695,920, claims 1-4, 7-14, 17 and 19. Executed Nov. 29. pp. 1-102.
Declaration of Dr. Magdy Attia. In re U.S. Appl. No. 8,313,280. Executed Oct. 21, 2016. pp. 1-88.
Lord, W.K., MacMartin, D.G., and Tillman, T.G. (2000). Flow control opportunities in gas turbine engines. American Institute of Aeronautics and Astronautics. pp. 1-15.
Daly, M. Ed. (2010). Jane's Aero-Engine. Issue Twenty-seven. Mar. 2010. p. 633-636.
Roux, E. (2007). Turbofan and turbojet engines database handbook. Editions Elodie Roux. Blagnac: France. pp. 1-595.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Declaration of Dr. Magdy Attia. In re U.S. Pat. No. 8,517,668. Executed Dec. 8, 2016. pp. 1-81.
Cramoisi, G. Ed. (2012). Death in the Potomac: The crash of Air Florida Flight 90. Air Crash Investigations. Accident Report NTSB/AAR-82-8. p. 45-47.
Norton, M. and Karczub, D. (2003). Fundamentals of noise and vibration analysis for engineers. Press Syndicate of the University of Cambridge. New York: New York. p. 524.
U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.
U.S. Department of Transportation: Federal Aviation Administration Advisory Circular. Standard operating procedures for flight deck crewmembers. Dated: Feb. 27, 2003.. p. 1-6 and Appendices.
Vasudevan, A.K. and Petrovic, J.J. (1992). A comparative overview of molybedenum disilicide composites. Materials Science and Engineering, A155, 1992. pp. 1-17.
Clarke, D.R. and Levi, C.G. (2003). Materials design for the next generation thermal barrier coatings. Annual. Rev. Mater. Res. vol. 33. 2003. pp. 383-417.
Lee, K.N. (2000). Current status of environmental barrier coatings for Si-Based ceramics. Surface and Coatings Technology 133-134, 2000. pp. 1-7.
Bornstein, N. (1993). Oxidation of advanced intermetallic compounds. Journal de Physique IV, 1993, 03 (C9), pp. C9-367-C9-373.
Krenkel, W., Naslain, R., and Schneider, H. Eds. (2001). High temperature ceramic matrix composites pp. 224-229. Weinheim, DE: Wiley-VCH Verlag GmbH.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.
Shah, D.M. (1992). MoSi2 and other silicides as high temperature structural materials. Superalloys 1992. The Minerals, Metals, & Materials Society. pp. 409-422.
Zhao, J.C. and Westbrook, J.H. (2003). Ultrahigh-temperature materials for jet engines. MRS Bulletin. vol. 28(9). Sep. 2003. pp. 622-630.
Tsirlin, M., Pronin, Y.E., Florina, E.K., Mukhametov, S. Kh., Khatsernov, M.A, Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Jacobson, N.S. (1993). Corrosion of silicon-based ceramics in combustion environments. J. Am. Ceram. Soc. 76(1). pp. 3-28.
Jorgensen, P.J., Wadsworth, M.E., and Cutler, I.B. (1961). Effects of water vapor on oxidation of silicon carbide. J. Am. Ceram. Soc. 44(6). pp. 248-261.

Xu, Y., Cheng, L., Zhang, L., Ying, H., and Zhou, W. (1999). Oxidation behavior and mechanical properties of C/SiC composites with Si—MoSi2 oxidation protection coating. J. of Mat. Sci. vol. 34. 1999. pp. 6009-6014.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.
Jeng, Y.-L., Lavernia, E.J. (1994). Processing of molybdenum disilicide. J. of Mat. Sci. vol. 29. 1994. pp. 2557-2571.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Petrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Muhlstein, C.L., Stach, E.A., and Ritchie, R.O. (2002). A reaction-layer mechanism for the delayed failure of micron-scale polycrystalline silicon structural films subjected to high-cycle fatigue loading. Ada Materialia vol. 50. 2002. pp. 3579-3595.
Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.
Leckie, F.A. and Dal Bello, D.J. (2009). Strength and stiffness of engineering systems. Mechanical Engineering Series. Springer. pp. 1-3.
El-Sayad, A.F. (2008). Aircraft propulsion and gas turbine engines. Boca Raton, FL: CRC Press. pp. 215-219 and 855-860.
Bunker, R.S. (2005). A review of shaped hole turbine film-cooling technology. Journal of Heat Transfer vol. 127. Apr. 2005. pp. 441-453.
Whitaker, R. (1982). ALF 502: plugging the turbofan gap. Flight International, p. 237-241, Jan. 30, 1982.
Munt, R. (1981). Aircraft technology assessment: Progress in low emissions engine. Technical Report. May 1981. pp. 1-171.
Waters, M.H. and Schairer, E.T. (1977). Analysis of turbofan propulsion system weight and dimensions. NASA Technical Memorandum. Jan. 1977. pp. 1-65.
Avco Lycoming Divison. ALF 502L Maintenance Manual. Apr. 1981. pp. 1-118.
Type Certificate Data Sheet No. E6NE. Department of Transportation Federal Aviation Administration. Jun. 7, 2002. pp. 1-10.
Trembley, Jr., H.F. (1977). Determination of effects of ambient conditions on aircraft engine emissions. Prepared for Environmental Protection Agency. Ann Arbor, Michigan. Sep. 1977 pp. 1-256.
Honeywell LF502. Jane's Aero-engines, Aero-engines—Turbofan. Feb. 9, 2012.
Honeywell LF502. Jane's Aero-engines, Aero-engines—Turbofan. Aug. 17, 2016.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Rauch, D. (1972). Design study of an air pump and integral lift engine ALF-504 using the Lycoming 502 core. Prepare for NASA. Jul. 1972. pp. 1-182.
Dassault Falcon 900EX Easy Systems Summary. Retrieved from: http://www.smartcockpit.com/docs/F900EX-Engines.pdf pp. 1-31.
Honeywell TFE731 Pilot Tips. pp. 1-143.
Honeywell TFE731-5AR to -5BR Engine Conversion Program. Sep. 2005. pp. 1-4.

(56) References Cited

OTHER PUBLICATIONS

Garret TFE731 Turbofan Engine (CAT C). Chapter 79: Lubrciation System. TTFE731 Issue 2. 2010. pp. 1-24.
Notice of Opposition to Patent No. 2809931. United Technologies Corporation opposed by Safran Aircraft Engines. dated Apr. 20, 2017.
Decision Denying Institution of Inter Pules Review. *General Electric Company.*, Petitioner, v. *United Technologies Corp.*, Patent Owner. IPR2017-00522. U.S. Pat. No. 8,899,915. Entered Jun. 23, 2017. pp. 1-18.
Gray, D.E. (1978). Energy efficient engine preliminary design and integration studies. Prepared for NASA. NASA CR-135396. Nov. 1978. pp. 1-366.
Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.
Reynolds, C.N. (1985). Advanced prop-fan engine technology (APET) single- and counter-rotation gearbox/pitch change mechanism. Prepared for NASA. NASA CR-168114 (vol. II). Jul. 1985. pp. 1-175.
U.S. Department of Transportation: Federal Aviation Administration Type Certificate Data Sheet No. E6WE. Dated: May 9, 2000. p. 1-9.
Daly, M. and Gunston, B. (2008). Jane's Aero-Engines. Pratt & Whitney PW8000. Issue Twenty-three.
Honeywell Sabreliner 65 TFE731-3 to -3D Engine Upgrade Program. Oct. 2005. pp. 1-4.
Honeywell Learjet 31 and 35/36 TFE731-2 to 2C Engine Upgrade Program. Sep. 2005. pp. 1-4.
Kurzke, J. (2012). GasTurb 12: Design and off-design performance of gas turbines. Retrieved from: https://www.scribd.com/document/153900429/GasTurb-12.
Ahmad, F. and Mizramoghadam, A.V. (1999). Single v. two stage high pressure turbine design of modern aero engines. ASME. Prestend at the International Gast Turbine & Aeroengine Congress & Exhibition. Indianapolis, Indiana. Jun. 7-10, 1999. pp. 1-9.
English translation of Measurement and calculation methodology on TFE731-2, TFE731-3A and TFE731-3D models.
English translation of Expert certificate concerning the technical nature of the drawings used in the measurement and calculation methodology.
Declaration of Raymond Drago. In re U.S. Pat. No. 8,297,916. IPR2018-01172. Executed May 29, 2018. pp. 1-115.
Parker, R.G. and Lin, J. (2001). Modeling, modal properties, and mesh stiffness variation instabilities of planetary gears. Prepared for NASA. NASA/CR-2001-210939. May 2001. pp. 1-111.
Declaration of Courtney H. Bailey. In re U.S. Pat. No. 8,511,605. Executed Jul. 19, 2016. pp. 1-4.
Mancuso, J.R. and Corcoran, J.P. (2003). What are the differences in high performance flexible couplings for turbomachinery? Proceedings of the Thirty-Second Turbomachinery Symposium. 2003. pp. 189-207.
Dudley, D.W., Ed. (1994). Practical gear design. New York, NY: McGraw-Hill. pp. 119-124.
Petition for Inter Partes Review of U.S. Pat. No. 8,297,916. *General Electric Company*, Petitioner, v. *United Technologies Corporation*, Patent Owner. IPR2018-01171. Filed May 30, 2018.
Petition for Inter Partes Review of U.S. Pat. No. 8,297,916. *General Electric Company*, Petitioner, v. *United Technologies Corporation*, Patent Owner. IPR2018-01172. Filed May 30, 2018.
English Translation of Notice of Opposition to Patent No. EP2949882. United Technologies Corporation opposed by Rolls Royce. dated Aug. 23, 2017.
English Translation of Notice of Opposition to Patent No. EP2811120. United Technologies Corporation opposed by Safran Aircraft Engines. dated Jul. 12, 2017.
English Translation of Notice of Opposition to Patent No. EP299882. United Technologies Corporation opposed by Safran Aircraft Engines. dated May 23, 2018.
English Translation of Notice of Opposition to Patent No. EP2811120. United Technologies Corporation opposed by Rolls Royce. dated Apr. 12, 2018.
Extended European Search Report for Application No. EP 17204160.0. dated Mar. 22, 2018.
Extended European Search Report for Application No. EP 17204153.5. dated Mar. 26, 2018.
Extended European Search Report for European Application No. 17210308.7 dated Apr. 19, 2018.
Pratt & Whitney Aircraft Group, "Energy Efficient Engine Flight Propulsion System Preliminary Analysis and Design Report", 1979, NASA CR-159487, p. i-450.
Mattingly, J.D. (2002). Aircraft engine design. American Institute of Aeronautics and Astronautics Inc. Jan. 2002. pp. 292-322.
Product Brochure. BR710. Rolls-Royce. Copyright 2008. pp. 1-4.
Praisner, T.J., Grover, E., Mocanu, R., Jurek, R., and Gacek, R. (2010). Predictions of unsteady interactions between closely coupled HP and LP turbines with co-and counter-rotation. Proceedings of ASME Turbo Expo 2010. Jun. 14-18, 2018. Glasgow, UK. p. 1-10.
Pratt & Whitney PW8000. Jane's Aero-Engines. Jane's by IHS Markit. Sep. 30, 2010.
Annexe Mesures—Methodologie de mesure et de calcul. Cited in: Notice of Opposition for European Pat. No. 2809932 dated Oct. 1, 2018.
Fowler, T.W. Ed. (1989). Jet engines and propulsion systems for engineers. GE Aircraft Engines. Training and Educational Development and the University of Cincinnati for Human Resource Development. pp. 1-516.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-733, 802-805, 828-830, 862-864, and 923-927.
Walsh, P.P. and Fletcher, P. (2004). Gas turbine performance, 2nd Edition. Oxford, UK: Blackwell Science. pp. 1-658.
ASME International Gas Turbine Institute. (Apr. 2013). Trends in the global energy supply and implications for the turbomachinery industry. Global Gas Turbine News, vol. 53(2). pp. 49, 53.
Halle, J.E. and Michael, C.J. (1984). Energy efficient engine fan component detailed design report. NASA-2R-165466. pp. 1-135.
Fitzpatrick, G.A., Broughton, T. (1987). The Rolls-Royce wide chord fan blade. Rolls-Royce Reporting. Mar. 19, 1987. pp. 1-19.
Fitzpatrick, G.A. and Broughton, T. (1988). Diffusion bonding aeroengine components. Def Scie J vol. 38(4). Oct. 1998. pp. 477-485.
(1987). Wide-chord fan—12 years of development. Aircraft Engineering and Aerospace Technology. vol. 59, issue 7. pp. 10-11. Retrieved Jul. 31, 2008 from: https://doi.org/10.1108/eb036471.
Product Brochure. TFE731 Engines: A new generation meeting your highest expectations for reliability, cost of ownership and performance. Allied Signal Aerospace. Copyright 1996. pp. 1-10.
Engine Alliance GP7200. Jane's Aero-Engines. Jane's by IHS Markit. Jul. 12, 2010.
General Electric GE90. Jane's Aero-Engines. Jane's by IHS Markit. Nov. 1, 2010.
Pratt & Whitney PW2000. Jane's Aero-Engines. Jane's by IHS Markit. Sep. 29, 2010.
Treager, I.E. (1995). Aircraft gas turbine engine technology, 3rd Edition. Glencoe Aviation Technology Series. McGraw-Hill.
Pratt & Whitney PW6000. Jane's Aero-Engines. Jane's by IHS Markit. Nov. 22, 2010.
United Technologies Pratt & Whitney. Jane's Aero-Engines. Jane's by IHS Markit. Aug. 30, 2000.
General Electric CF34. Jane's Aero-Engines. Jane's by IHS Markit. Jul. 26, 2010.
CFM International CFM56. Jane's Aero-Engines. Jane's by IHS Markit. Jan. 31, 2011.
Roux, E. (2007). Turbofan and turbojet engines database handbook. Editions Elodie Roux. Blagnac: France. pp. 41-43 and 464-469.
U.S. Department of Transportation: Federal Aviation Administration Type Certificate Data Sheet No. E00064EN. Dated: Nov. 24, 2006. p. 1-5.
*Dr. Raymond G. Tronzo* v. *Biomet Inc.*, 156 F.3d 1154 (1998).

(56) References Cited

OTHER PUBLICATIONS

Request for Opinion as to Validity for European Patent No. 2809922 (13778330.4) by Rolls Royce dated Feb. 6, 2019.
Annotation of Edkins, D.P., Hirschkron, R., and Lee, R. (1972). TF34 turbofan quiet engine study. Final Report prepared for NASA. NASA-CR-120914. Jan. 1, 1972. p. 92.
Annotation of Gray, D.E. (1978). Energy efficient engine preliminary design and integration studies. Prepared for NASA. NASA CR-135396. Nov. 1978. p. 70.
Decision Institution of Inter Partes Review. *General Electric Company.*, Petitioner, v. *United Technologies Corp.*, Patent Owner. IPR2018-01442. U.S. Pat. No. 9,695,751. Entered Feb. 21, 2019. pp. 1-25.
Third Party Observations for European Patent Application No. 13777804.9 dated Dec. 19, 2018.
Third Party Observations for European Patent Application No. 13854452.3 dated Dec. 13, 2018.
Third Party Observations for European Patent Application No. 13743282 dated Dec. 13, 2018.
Third Party Observations for European Patent Application No. 13775188.9 dated Dec. 13, 2018.
Third Party Observations for European Patent Application No. 13775036.0 dated Dec. 13, 2018.
Third Party Observations for European Patent Application No. 13822569.3 dated Dec. 13, 2018.
Gray, De. and Gardner, W.B. (1983). Energy efficient engine program technology benefit/cost study—vol. 2. NASA CR-174766. Oct. 1983. pp. 1-99.
Third Party Observations for European Patent Application No. 14155460.0 dated Oct. 29, 2018 by Rolls Royce.
About GasTurb. Retrieved Jun. 26, 2018 from: http://gasturb.de/about-gasturb.html.
Kurzke, J. (2001). GasTurb 9: A porgram to calculate design and off-design performance of gas turbines. Retrieved from: https://www.scribd.com/document/92384867/GasTurb9Manual.
Tummers, B. (2006). DataThief III. Retreived from: https://datathief.org/DatathiefManual.pdf pp. 1-52.
Manual. Student's Guide to Learning SolidWorks Software. Dassault Systemes—SolidWorks Corporation. pp. 1-56.
Macisaac, B. and Langston, R. (2011). Gas turbine propulsion systems. Chichester, West Sussex: John Wiley & Sons, Ltd. pp. 260-265.
Datasheet. CFM56-5B for the Airbus A320ceo family and CFM56-7B for the Boeing 737 family. https://www.cfmaeroengines.com/.
Turner, M. G., Norris, A., and Veres, J.P. (2004). High-fidelity three-dimensional simulation of the GE90. NASA/TM-2004-212981. pp. 1-18.
Petition for Inter Partes Review of U.S. Pat. No. 9,695,751. *General Electric Company*, Petitioner, v. *United Technologies Corporation*, Patent Owner. IPR2018-01442. Filed Jul. 24, 2018.
Notice of Opposition of European Patent No. 2834469 dated Mar. 27, 2019 by Safran Aircraft Engines.
Rolls-Royce Trent 900. Jane's Aero-Engines. Jane's by IHS Markit. Feb. 8, 2012.
Rolls-Royce Trent XWB. Jane's Aero-Engines. Jane's by IHS Markit. Mar. 6, 2012.
The jet engine. Rolls-Royce plc. 5th Edition. 1996. pp. 48.
Gas turbine technology: Introduction to a jet engine. Rolls-Royce plc. Dec. 2007.
Bradley, A. (2010). Presentation: Engine design for the environment. Rolls-Royce. RAeS—Hamburg. Jun. 24, 2010.
Response to Holder's Response. European Patent No. 2949882 dated Mar. 12, 2019 by Safran Aircraft Engines.
Response to Statement of Grounds of Appeal from the Patent Holder for European Patent No. 2809931 by Safran Aircraft Engine dated Aug. 21, 2019.
Notice of Opposition of European Patent No. 2949881 dated May 28, 2019 by Safran Aircraft Engines.
Notice of Opposition of European Patent No. 2949881 dated May 28, 2019 by Rolls-Royce.
Summons to Attend Oral Proceedings for European Patent Application No. 13743283.7 dated May 28, 2019.
Third Party Observations submitted by Rolls-Royce plc for European Patent Application No. 16156289.7 dated Jun. 12, 2019.
Lacaze, J. and Hazotte, A. (1990). Directionally solidified materials: nickel-base superalloys for gas turbines. Textures and Microstructures, 1990, vol. 13, pp. 1-14.
Suynn, M. D., Berton, J.J., Fisher, K. L., Haller, W.J., Tong, M. T., and Thurman, D.R. (2009). Analysis of turbofan design options for an advanced single-aisle transport aircraft. American Institute of Aeronautics and Astronautics. pp. 1-13.
Letter from the Opponent for European Patent Application No. 2811120 (14155460.0) dated Feb. 15, 2019 by Safran Aircraft Engines.
Request for Opinion as to Validity of European Patent No. 2809922B1 (13778330.4) Observations-in-Reply dated Apr. 3, 2019 by Rolls-Royce.
Opinion under Section 74(a) for European Patent Application No. 2809922 dated May 9, 2019.
Statement of Appeal filed Mar. 22, 2019 by Safran in European Patent 2809931 (13743042.7).
Summons to Attend Oral Proceedings for European Patent Application No. 13822569.3 dated Oct. 23, 2019.
Brief Communication from Opponent after Oral Proceedings for European Patent Application No. 13743283.7 by Safran Aircraft Engines dated Dec. 2, 2019.
Third Party Observations for European Patent Application No. 13777804.9 by Rolls-Royce dated Nov. 21, 2019.
Summons to Attend Oral Proceedings for European Patent Application No. 13778330.4 dated Dec. 2, 2019.
Summons to Attend Oral Proceedings for European Patent Application No. 13777804.9 dated Dec. 10, 2019.
Response to the Summons of Oral Proceedings for European Patent No. 3051078 by Rolls-Royce dated Oct. 17, 2019.

\* cited by examiner

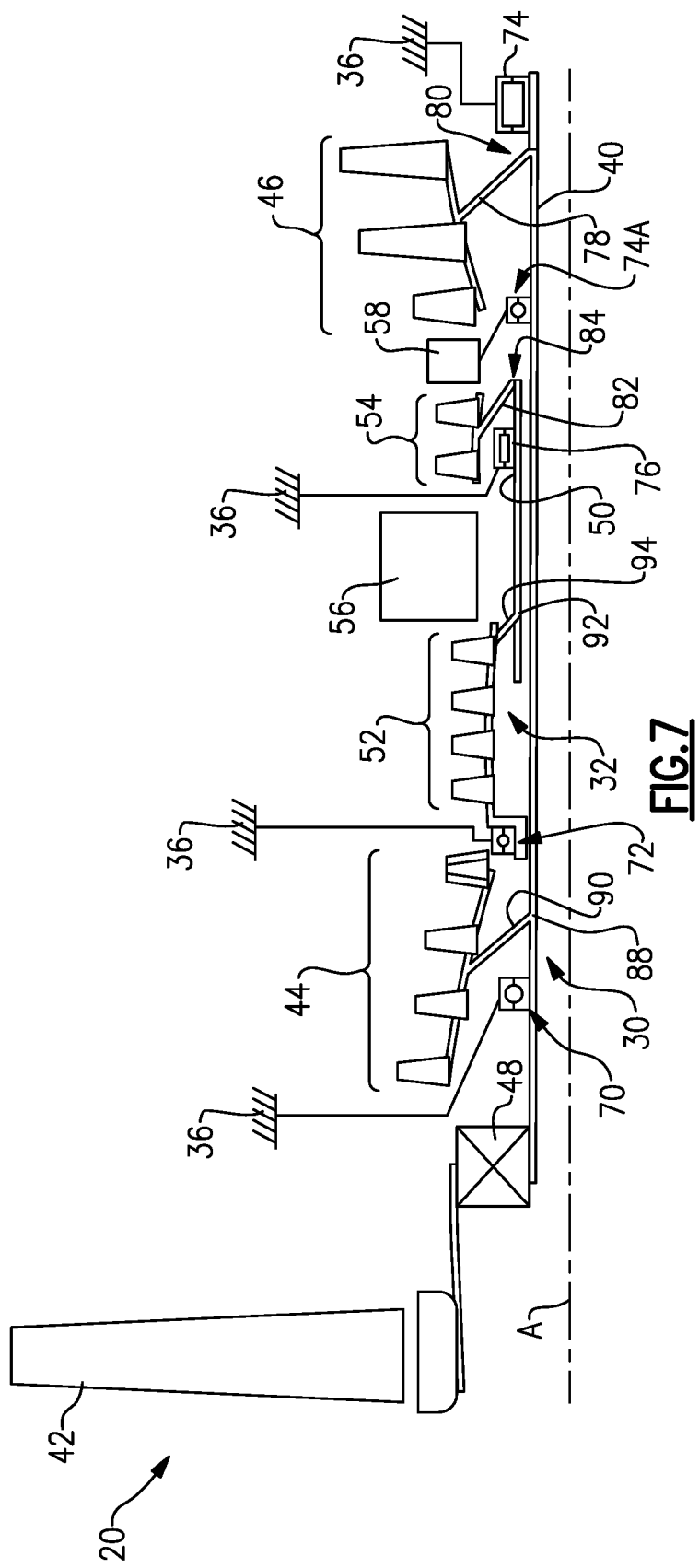

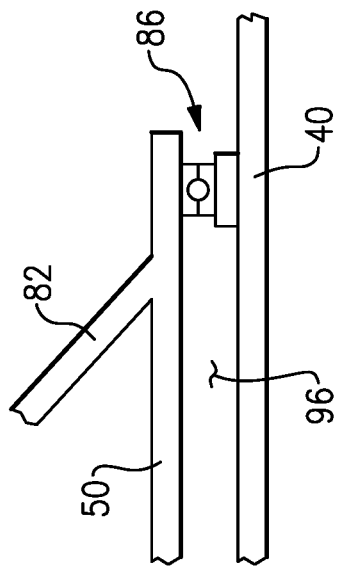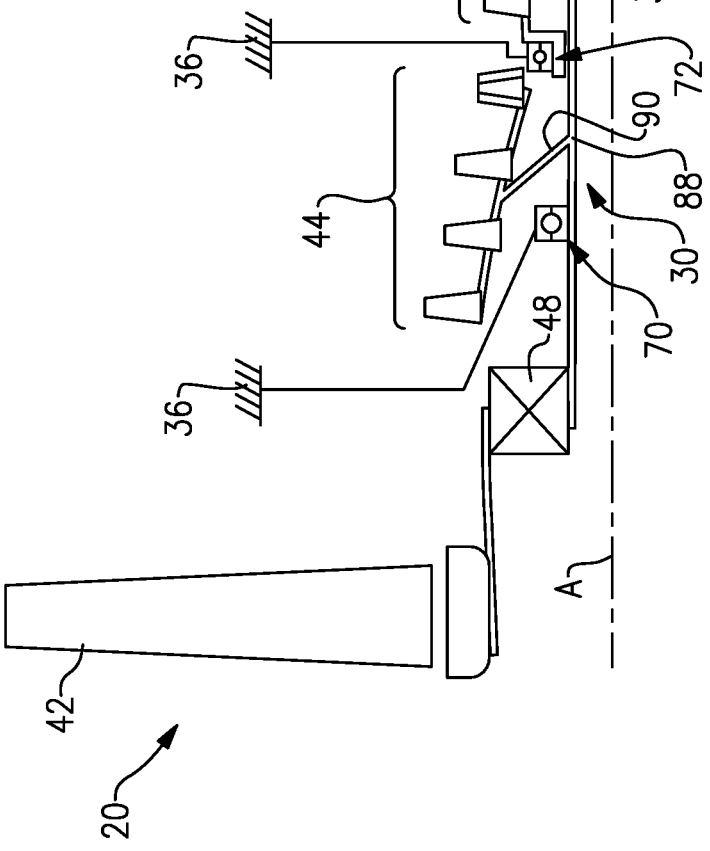

GEARED TURBOFAN GAS TURBINE ENGINE ARCHITECTURE

CROSS REFERENCE TO RELATED APPLICATION

This application is a continuation of U.S. application Ser. No. 14/662,459, filed Mar. 19, 2015, which is a continuation in part of U.S. application Ser. No. 13/645,773, filed on Oct. 5, 2012, which is a continuation in part of U.S. application Ser. No. 13/363,154, filed Jan. 31, 2012. U.S. application Ser. No. 13/645,773 also claims priority to Provisional Application No. 61/653,794, filed May 31, 2012.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The inner shaft may also drive the fan section. A direct drive gas turbine engine includes a fan section driven by the inner shaft such that the low pressure compressor, low pressure turbine and fan section rotate at a common speed in a common direction.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a speed different than the turbine section such that both the turbine section and the fan section can rotate at closer to optimal speeds.

Although geared architectures have improved propulsive efficiency, turbine engine manufacturers continue to seek further improvements to engine performance including improvements to thermal, transfer and propulsive efficiencies.

SUMMARY

A gas turbine engine according to an exemplary embodiment of this disclosure, among other possible things includes a fan including a plurality of fan blades rotatable about an axis, a compressor section, a combustor in fluid communication with the compressor section, and a turbine section in fluid communication with the combustor. The turbine section includes a fan turbine and a second turbine. The second turbine is disposed forward of the fan drive turbine. The fan drive turbine includes a plurality of turbine rotors with a ratio between the number of fan blades and the number of fan drive turbine rotors is greater than about 2.5. A speed change system is driven by the fan drive turbine for rotating the fan about the axis. The fan drive turbine has a first exit area and rotates at a first speed. The second turbine section has a second exit area and rotates at a second speed, which is faster than the first speed. A first performance quantity is defined as the product of the first speed squared and the first area. A second performance quantity is defined as the product of the second speed squared and the second area. A performance ratio of the first performance quantity to the second performance quantity is between about 0.5 and about 1.5.

In a further embodiment of the foregoing engine, the performance ratio is above or equal to about 0.8.

In a further embodiment of any of the foregoing engines, the first performance quantity is above or equal to about 4.

In a further embodiment of any of the foregoing engines, the speed change system includes a gearbox. The fan and the fan drive turbine both rotate in a first direction about the axis and the second turbine section rotates in a second direction opposite the first direction.

In a further embodiment of any of the foregoing engines, the speed change system includes a gearbox. The fan, the fan drive turbine, and the second turbine section all rotate in a first direction about the axis.

In a further embodiment of any of the foregoing engines, the speed change system includes a gearbox. The fan and the second turbine both rotate in a first direction about the axis and the fan drive turbine rotates in a second direction opposite the first direction.

In a further embodiment of any of the foregoing engines, the speed change system includes a gearbox. The fan is rotatable in a first direction and the fan drive turbine, and the second turbine section rotate in a second direction opposite the first direction about the axis.

In a further embodiment of any of the foregoing engines, the speed change system includes a gear reduction having a gear ratio greater than about 2.3.

In a further embodiment of any of the foregoing engines, the fan delivers a portion of air into a bypass duct. A bypass ratio being defined as the portion of air delivered into the bypass duct divided by the amount of air delivered into the compressor section, with the bypass ratio being greater than about 6.0.

In a further embodiment of any of the foregoing engines, the bypass ratio is greater than about 10.0.

In a further embodiment of any of the foregoing engines, a fan pressure ratio across the fan is less than about 1.5.

In a further embodiment of any of the foregoing engines, the fan has about 26 or fewer blades.

In a further embodiment of any of the foregoing engines, the fan drive turbine section has up to 6 stages.

In a further embodiment of any of the foregoing engines, the ratio between the number of fan blades and the number of fan drive turbine rotors is less than about 8.5.

In a further embodiment of any of the foregoing engines, a pressure ratio across the fan drive turbine is greater than about 5:1.

In a further embodiment of any of the foregoing engines, includes a power density greater than about 1.5 $lbf/in^3$ and less than or equal to about 5.5 $lbf/in^3$.

In a further embodiment of any of the foregoing engines, the fan drive turbine includes a first aft rotor attached to a first shaft. The second turbine includes a second aft rotor attached to a second shaft. A first bearing assembly is disposed axially aft of a first connection between the first aft rotor and the first shaft. A second bearing assembly is disposed axially aft of a second connection between the second aft rotor and the second shaft.

In a further embodiment of any of the foregoing engines, the fan drive turbine includes a first aft rotor attached to a first shaft. The second turbine includes a second aft rotor attached to a second shaft. A first bearing assembly is disposed axially aft of a first connection between the first aft rotor and the first shaft. A second bearing assembly is disposed axially forward of a second connection between the second aft rotor and the second shaft.

In a further embodiment of any of the foregoing engines, the fan drive turbine includes a first aft rotor attached to a first shaft. The second turbine includes a second aft rotor attached to a second shaft. A first bearing assembly is disposed axially aft of a first connection between the first aft rotor and the first shaft. A second bearing assembly is disposed within the annular space defined between the first shaft and the second shaft.

In a further embodiment of any of the foregoing engines, the fan drive turbine includes a first aft rotor attached to a first shaft. The second turbine includes a second aft rotor attached to a second shaft. A first bearing assembly is disposed axially forward of a first connection between the first aft rotor and the first shaft. A second bearing assembly is disposed axially aft of a second connection between the second aft rotor and the second shaft.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 7 is another schematic view of a bearing configuration supporting rotation of example high and low spools of the example gas turbine engine.

FIG. 8A is another schematic view of a bearing configuration supporting rotation of example high and low spools of the example gas turbine engine.

FIG. 8B is an enlarged view of the example bearing configuration shown in FIG. 8A.

DETAILED DESCRIPTION

Figure 1:
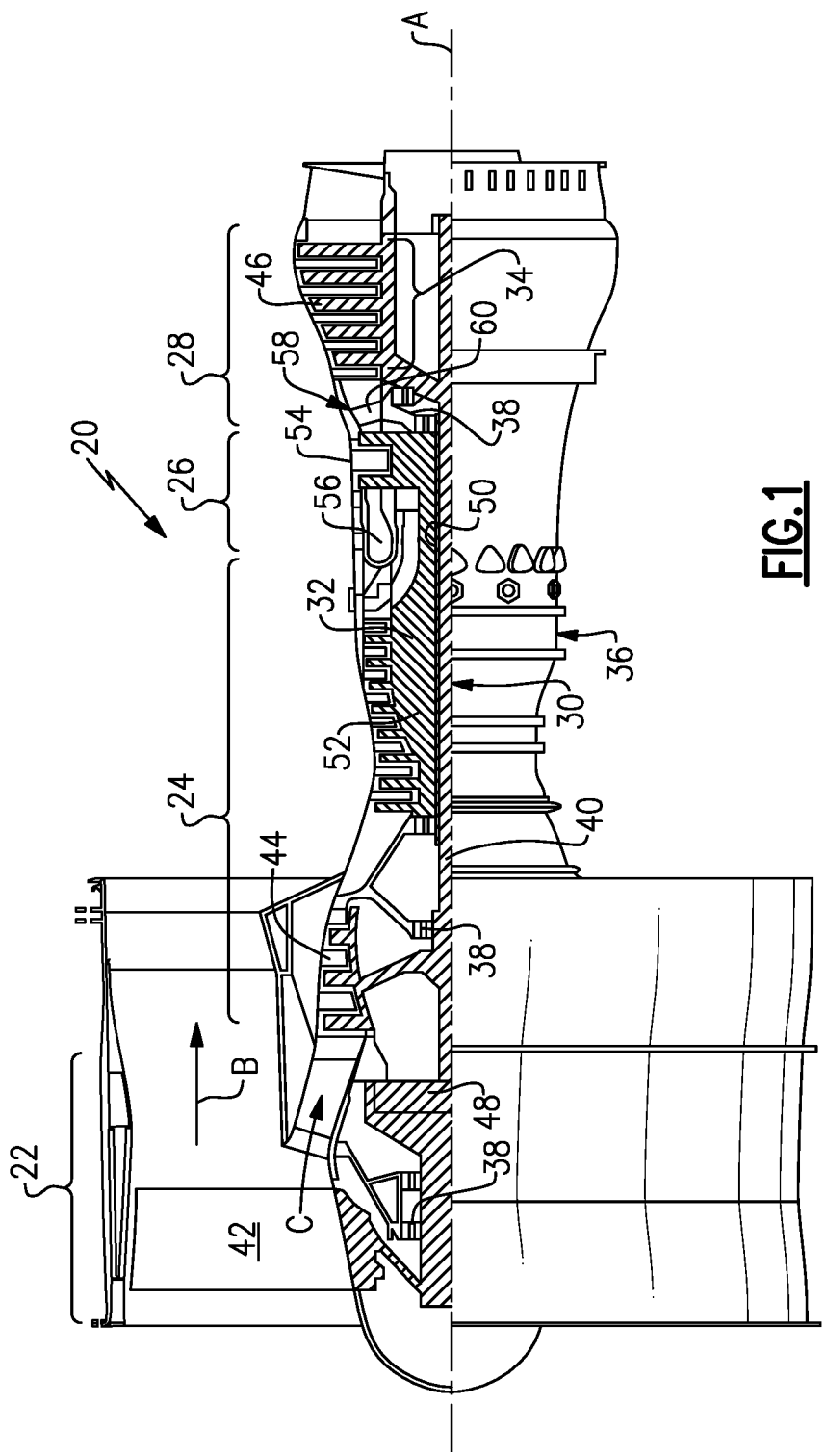
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis such that a low spool enables a low pressure turbine to drive a fan via a gearbox, an intermediate spool enables an intermediate pressure turbine to drive a first compressor of the compressor section, and a high spool enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best cruise fuel consumption relative to the thrust it produces—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum bucket cruise point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/518.7)^{0.5}]$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 18 fan blades. Moreover, in one disclosed embodiment the low pressure turbine 46 includes no more than 6 turbine stages schematically indicated at 34. In another non-limiting example embodiment the low pressure turbine 46 includes about 3 or more turbine stages. A ratio between the number of fan blades 42 and the number of low pressure turbine stages is between about 2.5 and about 8.5. The example low pressure turbine 46 provides the driving power to rotate the fan section 22 and therefore the relationship between the number of turbine stages 34 in the low pressure turbine 46 and the number of blades 42 in the fan section 22 disclose an example gas turbine engine 20 with increased power transfer efficiency.

Increased power transfer efficiency is provided due in part to the increased use of improved turbine blade materials and manufacturing methods such as directionally solidified castings, and single crystal materials that enable increased turbine speed and a reduced number of stages. Moreover, the example low pressure turbine 46 includes improved turbine disks configurations that further enable desired durability at the higher turbine speeds.

Figure 2:
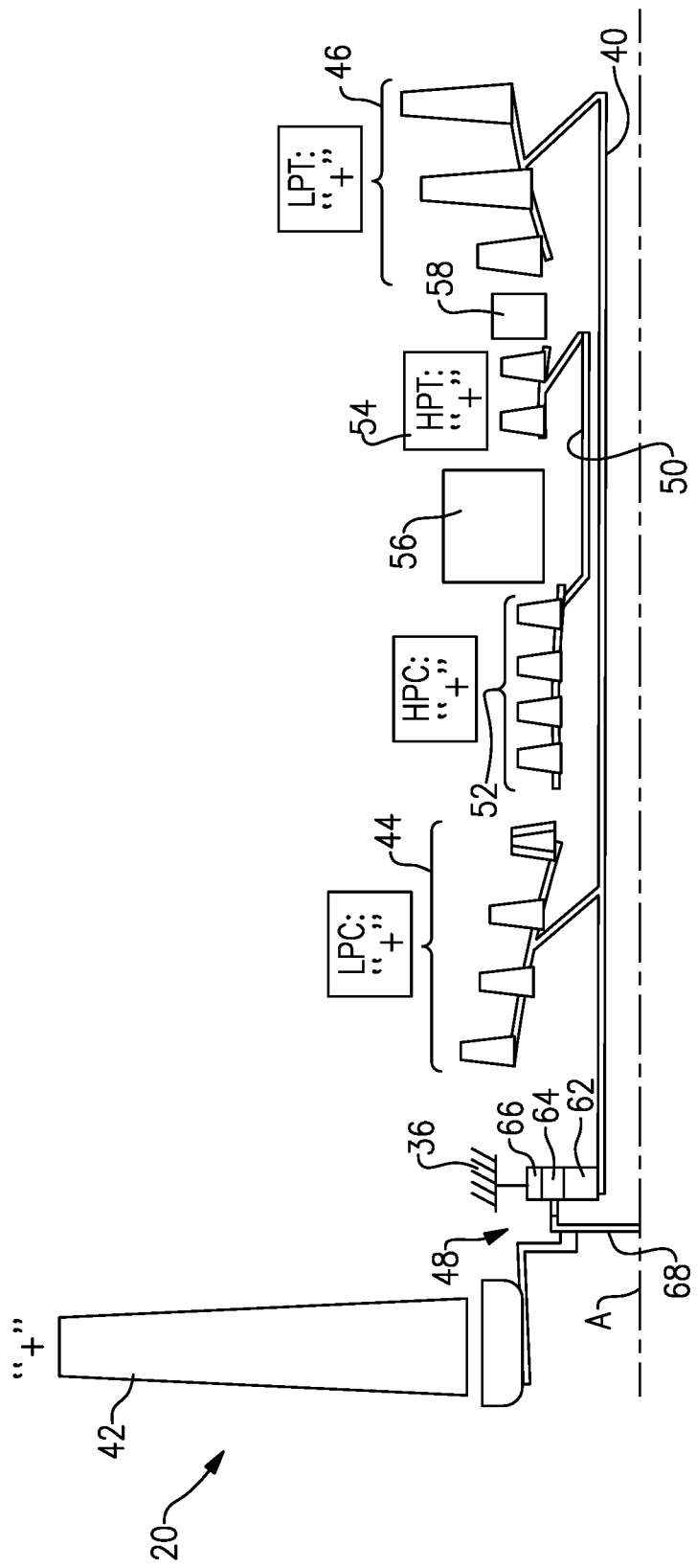
FIG. 2 is a schematic view indicating relative rotation between sections of an example gas turbine engine.
Figure 3:
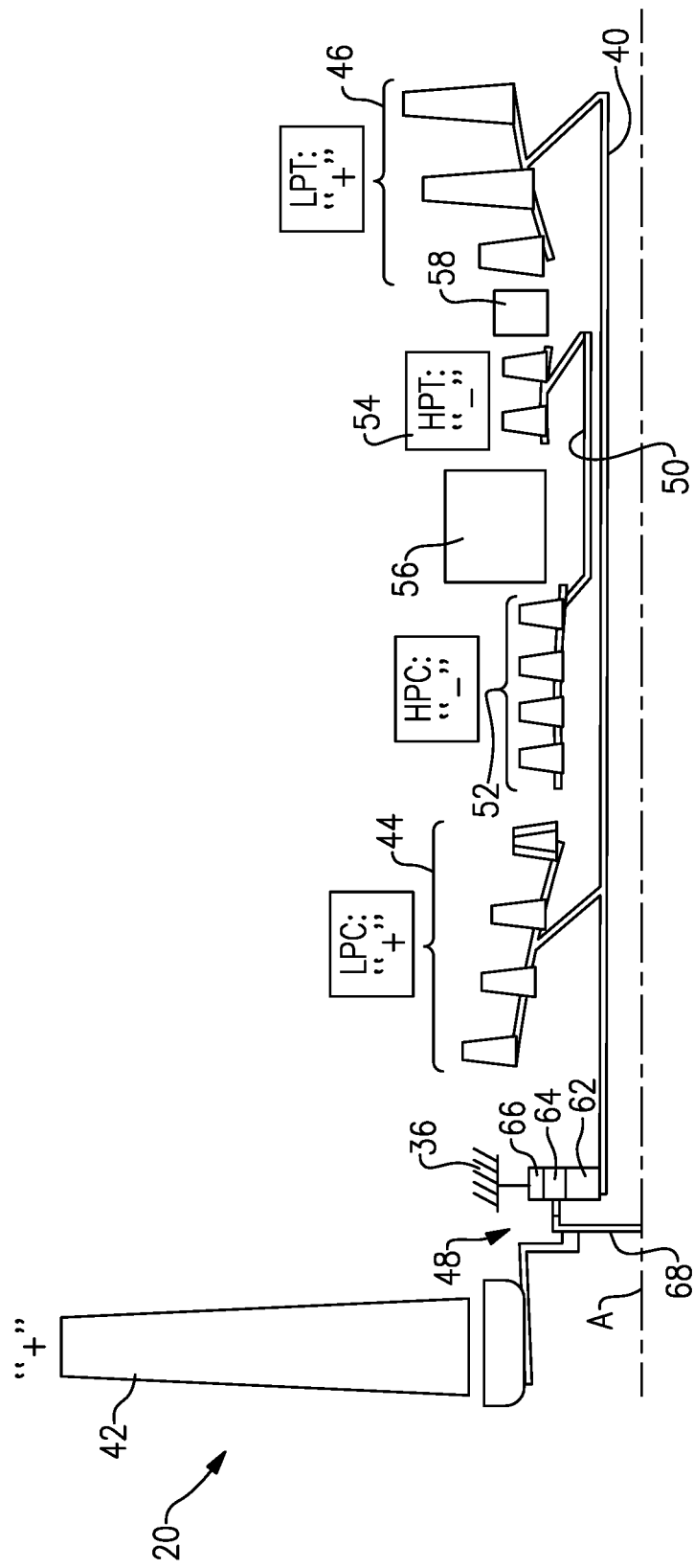
FIG. 3 is another schematic view indicating relative rotation between sections of an example gas turbine engine.

Referring to FIGS. 2 and 3, an example disclosed speed change device is an epicyclical gearbox of a planet type, where the input is to the center "sun" gear 62. Planet gears 64 (only one shown) around the sun gear 62 rotate and are spaced apart by a carrier 68 that rotates in a direction common to the sun gear 62. A ring gear 66, which is non-rotatably fixed to the engine static casing 36 (shown in FIG. 1), contains the entire gear assembly. The fan 42 is attached to and driven by the carrier 68 such that the direction of rotation of the fan 42 is the same as the direction of rotation of the carrier 68 that, in turn, is the same as the direction of rotation of the input sun gear 62.

In the following figures nomenclature is utilized to define the relative rotations between the various sections of the gas turbine engine 20. The fan section is shown with a "+" sign indicating rotation in a first direction. Rotations relative to the fan section 22 of other features of the gas turbine engine are further indicated by the use of either a "+" sign or a "−" sign. The "−" sign indicates a rotation that is counter to that of any component indicated with a "+" sign.

Moreover, the term fan drive turbine is utilized to indicate the turbine that provides the driving power for rotating the blades 42 of the fan section 22. Further, the term "second turbine" is utilized to indicate the turbine before the fan drive turbine that is not utilized to drive the fan 42. In this disclosed example, the fan drive turbine is the low pressure turbine 46, and the second turbine is the high pressure turbine 54. However, it should be understood that other turbine section configurations that include more than the shown high and low pressure turbines 54, 46 are within the contemplation of this disclosure. For example, a three spool engine configuration may include an intermediate turbine (not shown) utilized to drive the fan section 22 and is within the contemplation of this disclosure.

In one disclosed example embodiment (FIG. 2) the fan drive turbine is the low pressure turbine 46 and therefore the fan section 22 and low pressure turbine 46 rotate in a common direction as indicated by the common "+" sign indicating rotation of both the fan 42 and the low pressure turbine 46. Moreover in this example, the high pressure turbine 54 or second turbine rotates in a direction common with the fan drive turbine 46. In another example shown in FIG. 3, the high pressure turbine 54 or second turbine rotates in a direction opposite the fan drive turbine (low pressure turbine 46) and the fan 42.

Counter rotating the low pressure compressor 44 and the low pressure turbine 46 relative to the high pressure compressor 52 and the high pressure turbine 54 provides certain efficient aerodynamic conditions in the turbine section 28 as the generated high speed exhaust gas flow moves from the high pressure turbine 54 to the low pressure turbine 46. The relative rotations in the compressor and turbine sections provide approximately the desired airflow angles between the sections, which improves overall efficiency in the turbine section 28, and provides a reduction in overall weight of the turbine section 28 by reducing or eliminating airfoils or an entire row of vanes.

Figure 4:
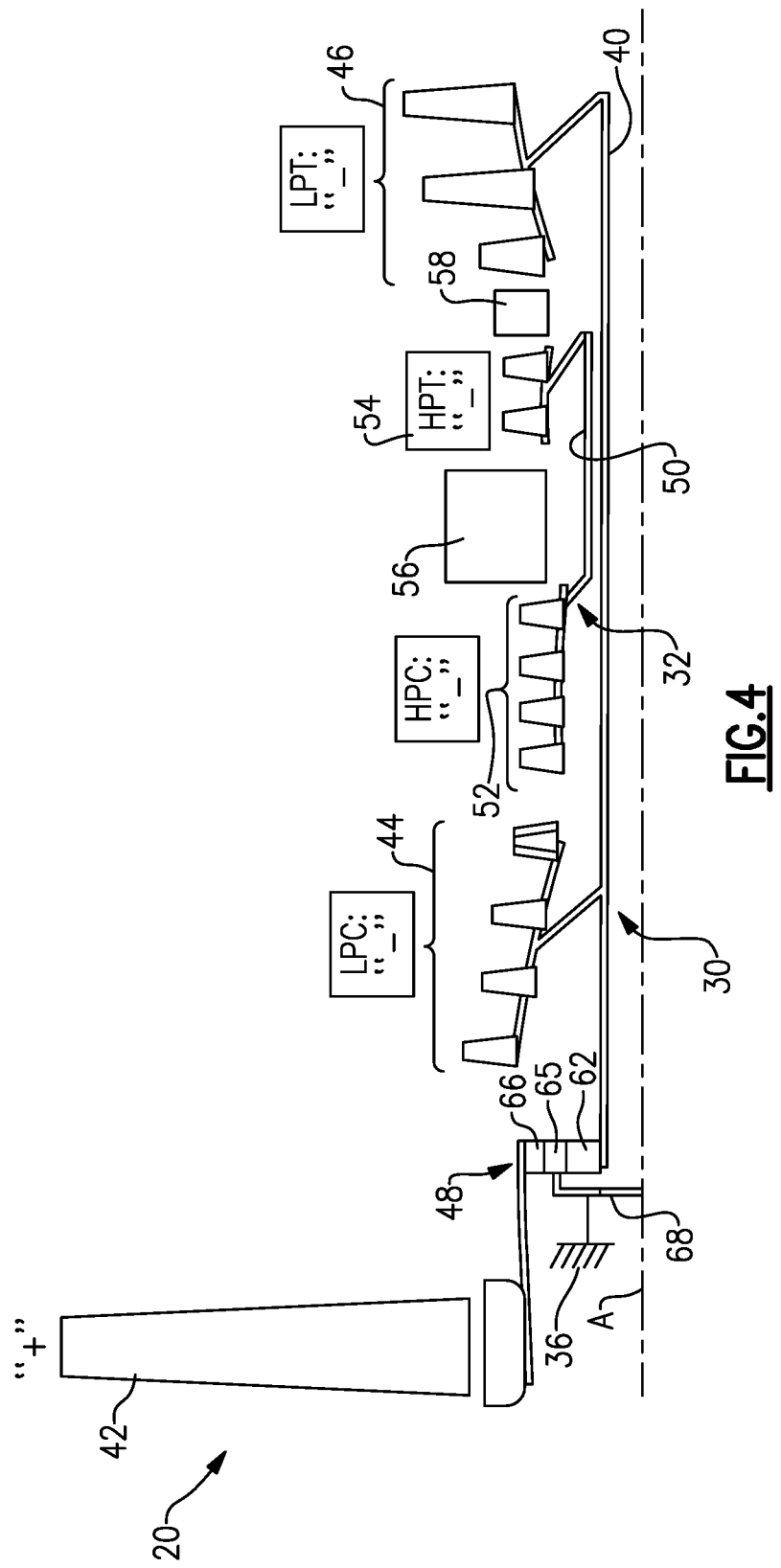
FIG. 4 is another schematic view indicating relative rotation between sections of an example gas turbine engine.
Figure 5:
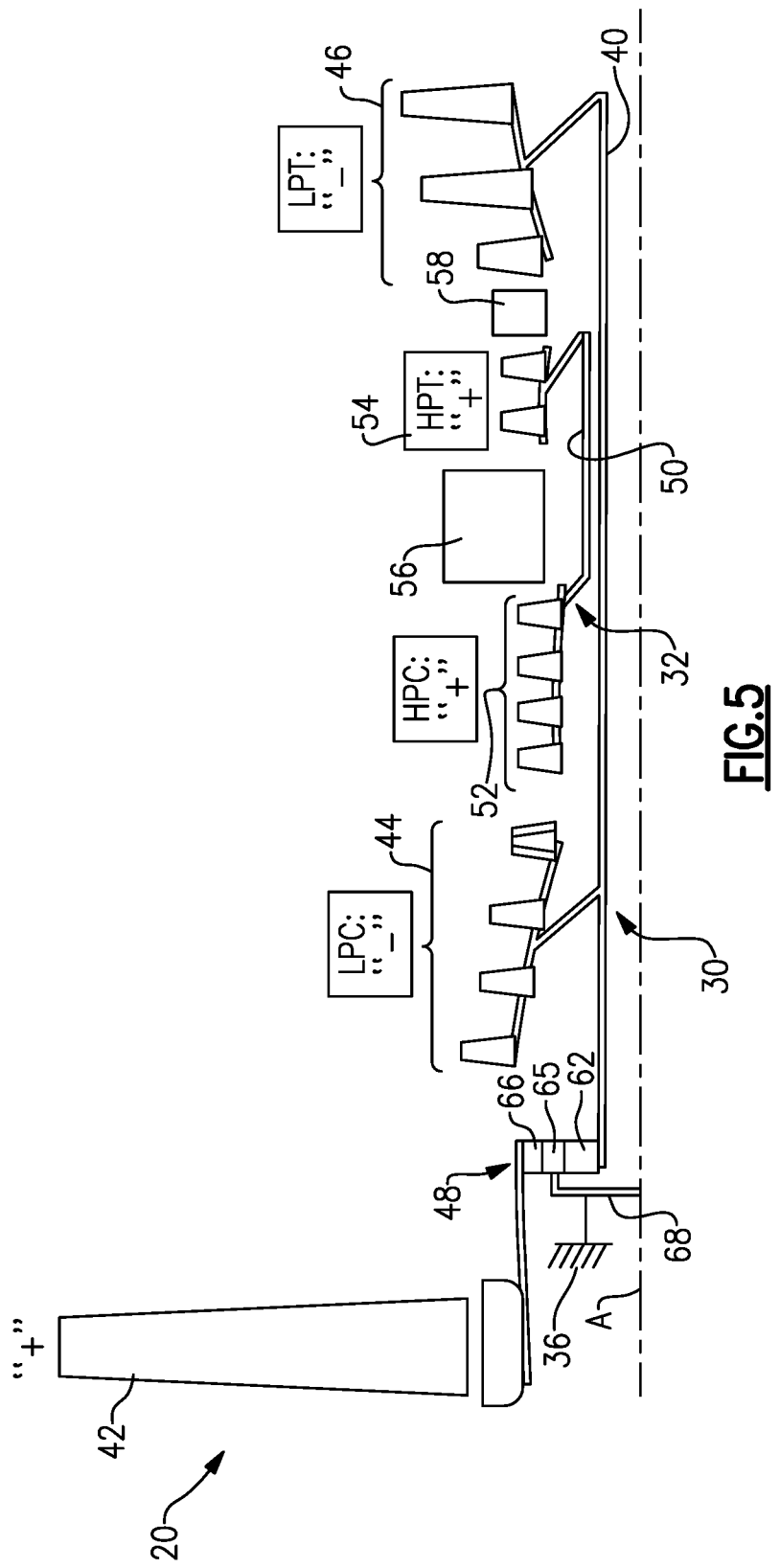
FIG. 5 is another a schematic view indicating relative rotation between sections of an example gas turbine engine.

Referring to FIGS. 4 and 5, another example disclosed speed change device is an epicyclical gearbox referred to as a star type gearbox, where the input is to the center "sun" gear 62. Star gears 65 (only one shown) around the sun gear 62 rotate in a fixed position around the sun gear and are spaced apart by a carrier 68 that is fixed to a static casing 36 (best shown in FIG. 1). A ring gear 66 that is free to rotate contains the entire gear assembly. The fan 42 is attached to and driven by the ring gear 66 such that the direction of rotation of the fan 42 is opposite the direction of rotation of the input sun gear 62. Accordingly, the low pressure compressor 44 and the low pressure turbine 46 rotate in a direction opposite rotation of the fan 42.

In one disclosed example embodiment shown in FIG. 4, the fan drive turbine is the low pressure turbine 46 and therefore the fan 42 rotates in a direction opposite that of the low pressure turbine 46 and the low pressure compressor 44. Moreover in this example the high spool 32 including the high pressure turbine 54 and the high pressure compressor 52 rotate in a direction counter to the fan 42 and common with the low spool 30 including the low pressure compressor 44 and the fan drive turbine 46.

In another example gas turbine engine shown in FIG. 5, the high pressure or second turbine 54 rotates in a direction common with the fan 42 and counter to the low spool 30 including the low pressure compressor 44 and the fan drive turbine 46.

Figure 6:
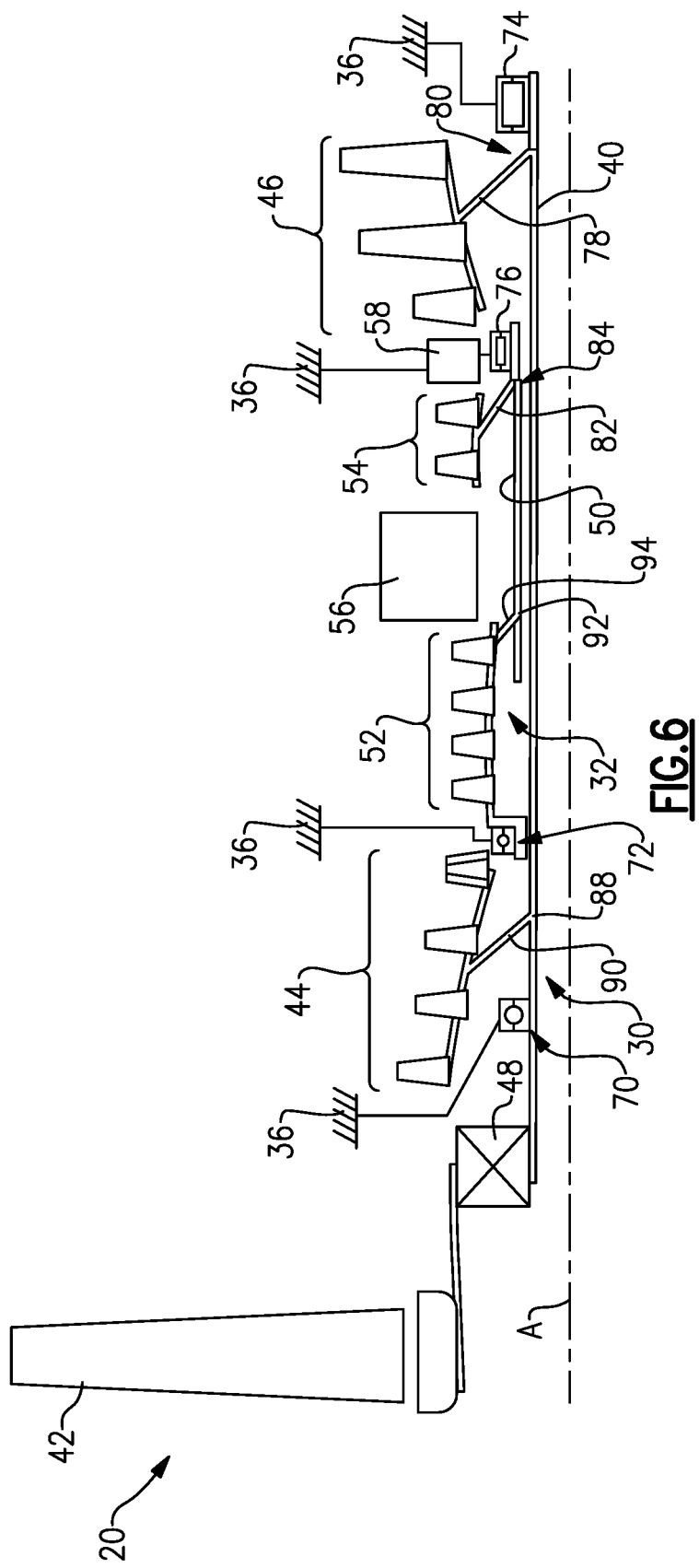
FIG. 6 is a schematic view of a bearing configuration supporting rotation of example high and low spools of the example gas turbine engine.

Referring to FIG. 6, the bearing assemblies near the forward end of the shafts in the engine at locations 70 and 72, which bearings support rotation of the inner shaft 40 and the outer shaft 50, counter net thrust forces in a direction parallel to the axis A that are generated by the rearward load of low pressure turbine 46 and the high pressure turbine 54, minus the high pressure compressor 52 and the low pressure compressor 44, which also contribute to the thrust forces acting on the corresponding low spool 30 and the high spool 32.

In this example embodiment, a first forward bearing assembly 70 is supported on a portion of the static structure schematically shown at 36 and supports a forward end of the inner shaft 40. The example first forward bearing assembly 70 is a thrust bearing and controls movement of the inner shaft 40 and thereby the low spool 30 in an axial direction. A second forward bearing assembly 72 is supported by the static structure 36 to support rotation of the high spool 32 and substantially prevent movement along in an axial direction of the outer shaft 50. The first forward bearing assembly 70 is mounted to support the inner shaft 40 at a point forward of a connection 88 of a low pressure compressor rotor 90. The second forward bearing assembly 72 is mounted forward of a connection referred to as a hub 92 between a high pressure compressor rotor 94 and the outer shaft 50. A first aft bearing assembly 74 supports the aft portion of the inner shaft 40. The first aft bearing assembly 74 is a roller bearing and supports rotation, but does not provide resistance to movement of the shaft 40 in the axial direction. Instead, the aft bearing 74 allows the shaft 40 to expand thermally between its location and the bearing 72. The example first aft bearing assembly 74 is disposed aft of a connection hub 80 between a low pressure turbine rotor 78 and the inner shaft 40. A second aft bearing assembly 76 supports the aft portion of the outer shaft 50. The example second aft bearing assembly 76 is a roller bearing and is supported by a corresponding static structure 36 through the mid turbine frame 58 which transfers the radial load of the shaft across the turbine flow path to ground 36. The second aft bearing assembly 76 supports the outer shaft 50 and thereby the high spool 32 at a point aft of a connection hub 84 between a high pressure turbine rotor 82 and the outer shaft 50.

In this disclosed example, the first and second forward bearing assemblies 70, 72 and the first and second aft bearing assemblies 74, 76 are supported to the outside of either the corresponding compressor or turbine connection hubs 80, 88 to provide a straddle support configuration of the corresponding inner shaft 40 and outer shaft 50. The straddle support of the inner shaft 40 and the outer shaft 50 provide a support and stiffness desired for operation of the gas turbine engine 20.

Referring to FIG. 7, another example shaft support configuration includes the first and second forward bearing assemblies 70, 72 disposed to support the forward portion of the corresponding inner shaft 40 and outer shaft 50. The first aft bearing 74 is disposed aft of the connection 80 between the rotor 78 and the inner shaft 40. The first aft bearing 74 is a roller bearing and supports the inner shaft 40 in a straddle configuration. The straddle configuration can require additional length of the inner shaft 40 and therefore an alternate configuration referred to as an overhung configuration can be utilized. In this example the outer shaft 50 is supported by the second aft bearing assembly 76 that is disposed forward of the connection 84 between the high pressure turbine rotor 82 and the outer shaft 50. Accordingly, the connection hub 84 of the high pressure turbine rotor 82 to the outer shaft 50 is overhung aft of the bearing assembly 76. This positioning of the second aft bearing 76 in an overhung orientation potentially provides for a reduced length of the outer shaft 50.

Moreover the positioning of the aft bearing 76 may also eliminate the need for other support structures such as the mid turbine frame 58 as both the high pressure turbine 54 is supported at the bearing assembly 76 and the low pressure turbine 46 is supported by the bearing assembly 74. Optionally the mid turbine frame strut 58 can provide an optional roller bearing 74A which can be added to reduce vibratory modes of the inner shaft 40.

Referring to FIGS. 8A and 8B, another example shaft support configuration includes the first and second forward bearing assemblies 70, 72 disposed to support corresponding forward portions of each of the inner shaft 40 and the outer shaft 50. The first aft bearing 74 provides support of the outer shaft 50 at a location aft of the connection 80 in a straddle mount configuration. In this example, the aft portion of the outer shaft 50 is supported by a roller bearing assembly 86 supported within a space 96 defined between an outer surface of the inner shaft 40 and an inner surface of the outer shaft 50.

Figure 9:
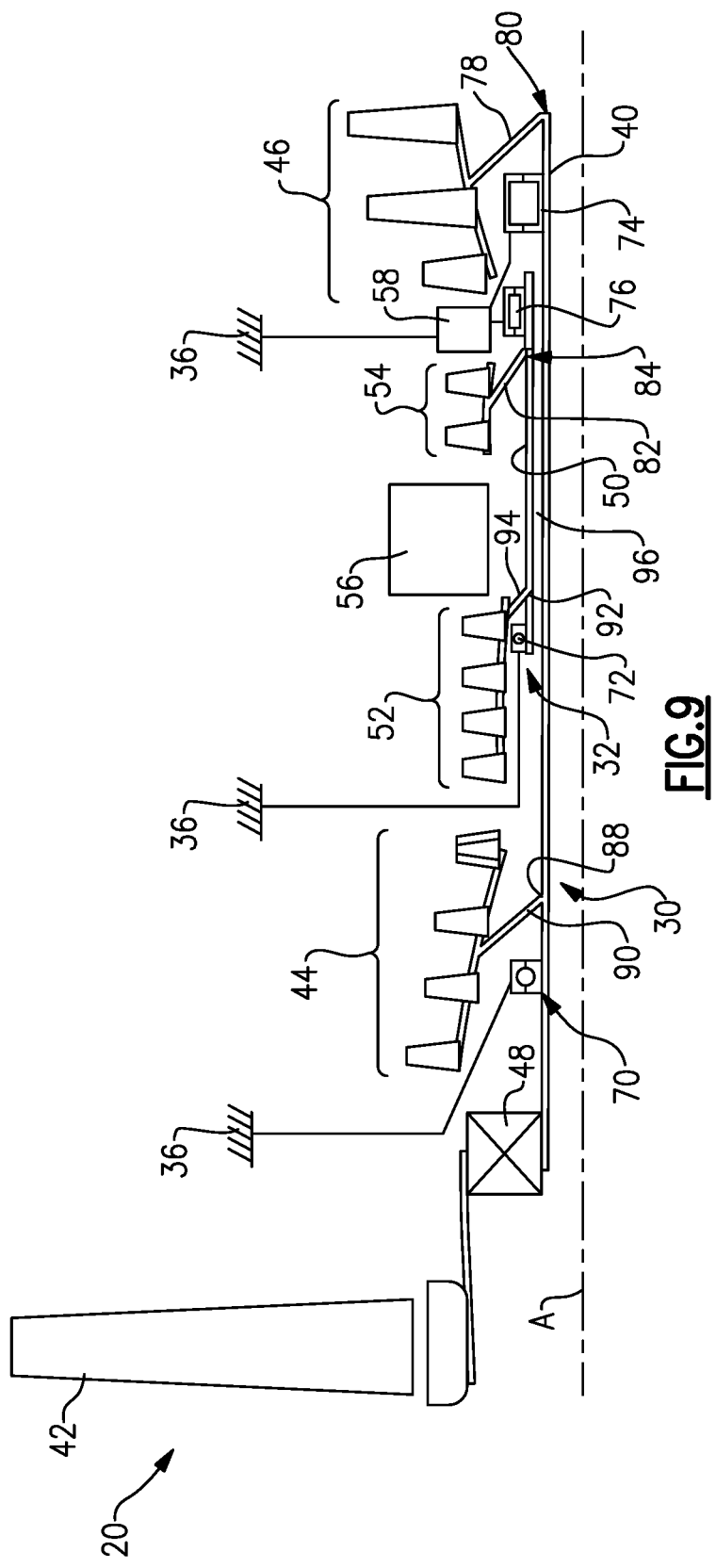
FIG. 9 is another schematic view of a bearing configuration supporting rotation of example high and low spools of the example gas turbine engine.

The roller bearing assembly 86 supports the aft portion of the outer shaft 50 on the inner shaft 40. The use of the roller bearing assembly 86 to support the outer shaft 50 eliminates the requirements for support structures that lead back to the static structure 36 through the mid turbine frame 58. Moreover, the example bearing assembly 86 can provide both a reduced shaft length, and support of the outer shaft 50 at a position substantially in axial alignment with the connection hub 84 for the high pressure turbine rotor 82 and the outer shaft 50. As appreciated, the bearing assembly 86 is positioned aft of the hub 82 and is supported through the rearmost section of shaft 50. Referring to FIG. 9, another example shaft support configuration includes the first and second forward bearing assemblies 70, 72 disposed to support corresponding forward portions of each of the inner shaft 40 and the outer shaft 50. The first aft bearing assembly 74 is supported at a point along the inner shaft 40 forward of the connection 80 between the low pressure turbine rotor 78 and the inner shaft 40.

Positioning of the first aft bearing 74 forward of the connection 80 can be utilized to reduce the overall length of the engine 20. Moreover, positioning of the first aft bearing assembly 74 forward of the connection 80 provides for support through the mid turbine frame 58 to the static structure 36. Furthermore, in this example the second aft bearing assembly 76 is deployed in a straddle mount configuration aft of the connection 84 between the outer shaft 50 and the rotor 82. Accordingly, in this example, both the first and second aft bearing assemblies 74, 76 share a common support structure to the static outer structure 36. As appreciated, such a common support feature provides for a less complex engine construction along with reducing the overall length of the engine. Moreover, the reduction or required support structures will reduce overall weight to provide a further improvement in aircraft fuel burn efficiency.

Figure 10:
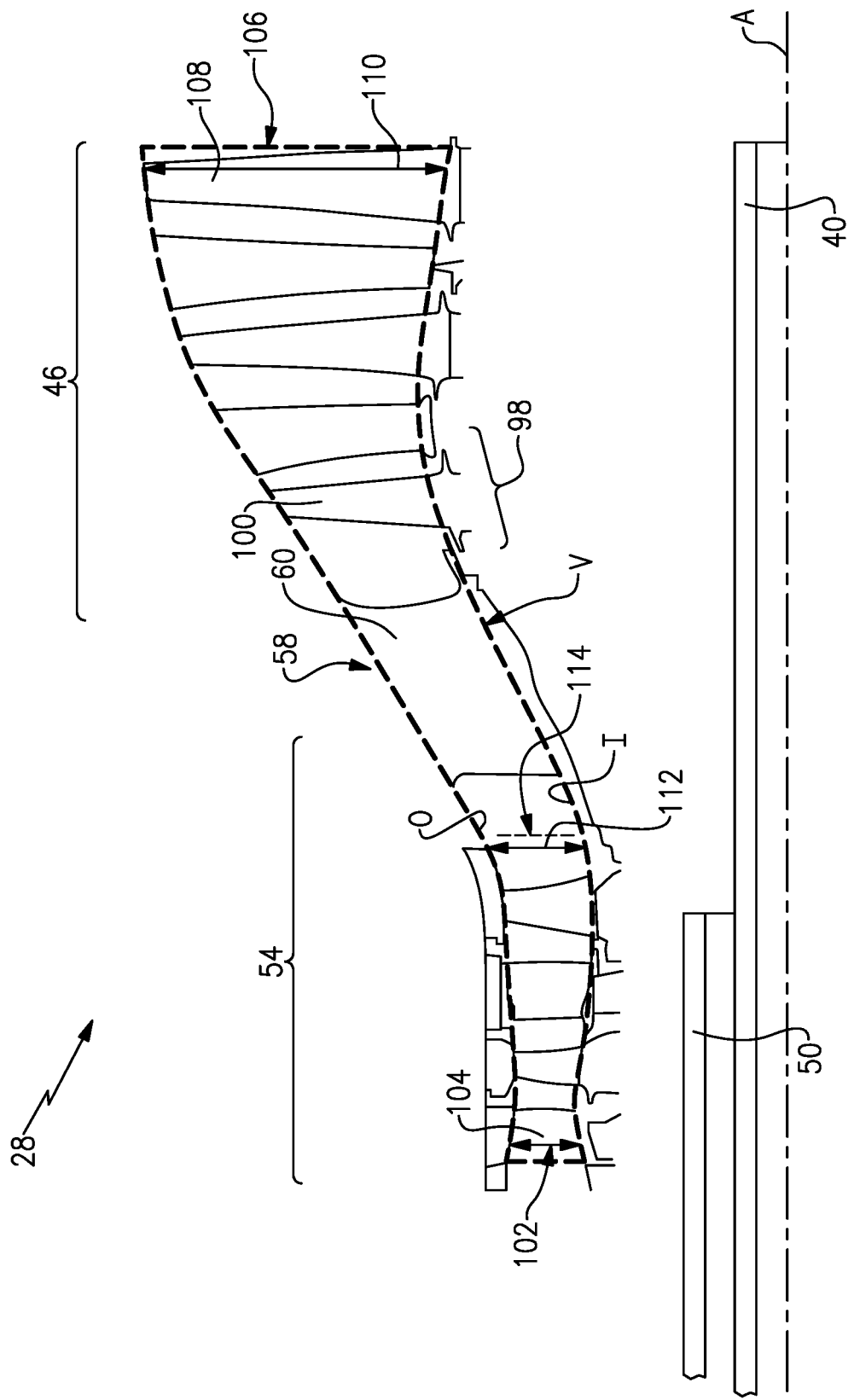
FIG. 10 is a schematic view of an example compact turbine section.

Referring to FIG. 10, a portion of the example turbine section 28 is shown and includes the low pressure turbine 46 and the high pressure turbine 54 with the mid turbine frame 58 disposed between an outlet of the high pressure turbine and the low pressure turbine. The mid turbine frame 58 and vane 60 are positioned to be upstream of the first stage 98 of the low pressure turbine 46. While a single vane 60 is illustrated, it should be understood these would be plural vanes 60 spaced circumferentially. The vane 60 redirects the flow downstream of the high pressure turbine 54 as it approaches the first stage 98 of the low pressure turbine 46. As can be appreciated, it is desirable to improve efficiency to have flow between the high pressure turbine 54 and the low pressure turbine 46 redirected by the vane 60 such that the flow of expanding gases is aligned as desired when entering the low pressure turbine 46. Therefore vane 60 may be an actual airfoil with camber and turning, that aligns the airflow as desired into the low pressure turbine 46.

By incorporating a true air-turning vane 60 into the mid turbine frame 58, rather than a streamlined strut and a stator vane row after the strut, the overall length and volume of the combined turbine sections 46, 54 is reduced because the vane 60 serves several functions including streamlining the mid turbine frame 58, protecting any static structure and any oil tubes servicing a bearing assembly from exposure to heat, and turning the flow entering the low pressure turbine 46 such that it enters the rotating airfoil 100 at a desired flow angle. Further, by incorporating these features together, the overall assembly and arrangement of the turbine section 28 is reduced in volume.

The above features achieve a more or less compact turbine section volume relative to the prior art including both high and low pressure turbines 54, 46. Moreover, in one example, the materials for forming the low pressure turbine 46 can be improved to provide for a reduced volume. Such materials may include, for example, materials with increased thermal and mechanical capabilities to accommodate potentially increased stresses induced by operating the low pressure turbine 46 at the increased speed. Furthermore, the elevated speeds and increased operating temperatures at the entrance to the low pressure turbine 46 enables the low pressure turbine 46 to transfer a greater amount of energy, more efficiently to drive both a larger diameter fan 42 through the geared architecture 48 and an increase in compressor work performed by the low pressure compressor 44.

Alternatively, lower priced materials can be utilized in combination with cooling features that compensate for increased temperatures within the low pressure turbine 46. In three exemplary embodiments a first rotating blade 100 of the low pressure turbine 46 can be a directionally solidified casting blade, a single crystal casting blade or a hollow, internally cooled blade. The improved material and thermal properties of the example turbine blade material provide for operation at increased temperatures and speeds, that in turn provide increased efficiencies at each stage that thereby provide for use of a reduced number of low pressure turbine stages. The reduced number of low pressure turbine stages in turn provide for an overall turbine volume that is reduced, and that accommodates desired increases in low pressure turbine speed.

The reduced stages and reduced volume provide improve engine efficiency and aircraft fuel burn because overall weight is less. In addition, as there are fewer blade rows, there are: fewer leakage paths at the tips of the blades; fewer leakage paths at the inner air seals of vanes; and reduced losses through the rotor stages.

The example disclosed compact turbine section includes a power density, which may be defined as thrust in pounds force (lbf) produced divided by the volume of the entire turbine section 28. The volume of the turbine section 28 may be defined by an inlet 102 of a first turbine vane 104 in the high pressure turbine 54 to the exit 106 of the last rotating airfoil 108 in the low pressure turbine 46, and may be expressed in cubic inches. The static thrust at the engine's flat rated Sea Level Takeoff condition divided by a turbine section volume is defined as power density and a greater power density may be desirable for reduced engine weight. The sea level take-off flat-rated static thrust may be defined in pounds-force (lbf), while the volume may be the volume from the annular inlet 102 of the first turbine vane 104 in the high pressure turbine 54 to the annular exit 106 of the downstream end of the last airfoil 108 in the low pressure turbine 46. The maximum thrust may be Sea Level Takeoff Thrust "SLTO thrust" which is commonly defined as the flat-rated static thrust produced by the turbofan at sea-level.

The volume V of the turbine section may be best understood from FIG. 10. As shown, the mid turbine frame 58 is disposed between the high pressure turbine 54, and the low pressure turbine 46. The volume V is illustrated by a dashed line, and extends from an inner periphery I to an outer periphery O. The inner periphery is defined by the flow path of rotors, but also by an inner platform flow paths of vanes. The outer periphery is defined by the stator vanes and outer air seal structures along the flowpath. The volume extends from a most upstream end of the vane 104, typically its leading edge, and to the most downstream edge of the last rotating airfoil 108 in the low pressure turbine section 46. Typically this will be the trailing edge of the airfoil 108.

The power density in the disclosed gas turbine engine is much higher than in the prior art. Eight exemplary engines are shown below which incorporate turbine sections and overall engine drive systems and architectures as set forth in this application, and can be found in Table I as follows:

TABLE 1

| Engine | Thrust SLTO (lbf) | Turbine section volume from the Inlet | Thrust/turbine section volume (lbf/in$^3$) |
|---|---|---|---|
| 1 | 17,000 | 3,859 | 4.40 |
| 2 | 23,300 | 5,330 | 4.37 |
| 3 | 29,500 | 6,745 | 4.37 |

TABLE 1-continued

| Engine | Thrust SLTO (lbf) | Turbine section volume from the Inlet | Thrust/turbine section volume (lbf/in³) |
|---|---|---|---|
| 4 | 33,000 | 6,745 | 4.84 |
| 5 | 96,500 | 31,086 | 3.10 |
| 6 | 96,500 | 62,172 | 1.55 |
| 7 | 96,500 | 46,629 | 2.07 |
| 8 | 37,098 | 6,745 | 5.50 |

Thus, in example embodiments, the power density would be greater than or equal to about 1.5 lbf/in³. More narrowly, the power density would be greater than or equal to about 2.0 lbf/in³. Even more narrowly, the power density would be greater than or equal to about 3.0 lbf/in³. More narrowly, the power density is greater than or equal to about 4.0 lbf/in³. Also, in embodiments, the power density is less than or equal to about 5.5 lbf/in³.

Engines made with the disclosed architecture, and including turbine sections as set forth in this application, and with modifications within the scope of this disclosure, thus provide very high efficient operation, and increased fuel efficiency and lightweight relative to their thrust capability.

An exit area 112 is defined at the exit location for the high pressure turbine 54 and an exit area 110 is defined at the outlet 106 of the low pressure turbine 46. The gear reduction 48 (shown in FIG. 1) provides for a range of different rotational speeds of the fan drive turbine, which in this example embodiment is the low pressure turbine 46, and the fan 42 (FIG. 1). Accordingly, the low pressure turbine 46, and thereby the low spool 30 including the low pressure compressor 44 may rotate at a very high speed. Low pressure turbine 46 and high pressure turbine 54 operation may be evaluated looking at a performance quantity which is the exit area for the respective turbine section multiplied by its respective speed squared. This performance quantity ("PQ") is defined as:

$$PQ_{ltp}=(A_{lpt} \times V_{lpt}^2) \quad \text{Equation 1:}$$

$$PQ_{hpt}=(A_{hpt} \times V_{hpt}^2) \quad \text{Equation 2:}$$

where $A_{lpt}$ is the area 110 of the low pressure turbine 46 at the exit 106, $V_{lpt}$ is the speed of the low pressure turbine section; $A_{hpt}$ is the area of the high pressure turbine 54 at the exit 114, and where $V_{hpt}$ is the speed of the high pressure turbine 54. As known, one would evaluate this performance quantity at the redline speed for each turbine section.

Thus, a ratio of the performance quantity for the low pressure turbine 46 compared to the performance quantify for the high pressure turbine 54 is:

$$(A_{lpt} \times V_{lpt}^2)/(A_{hpt} \times V_{hpt}^2)=PQ_{ltp}/PQ_{hpt} \quad \text{Equation 3:}$$

In one turbine embodiment made according to the above design, the areas of the low and high pressure turbines 46, 54 are 557.9 in² and 90.67 in², respectively. Further, the redline speeds of the low and high pressure turbine 46, 54 are 10179 rpm and 24346 rpm, respectively. Thus, using Equations 1 and 2 above, the performance quantities for the example low and high pressure turbines 46, 54 are:

$$PQ_{ltp}=(A_{lpt} \times V_{lpt}^2)=(557.9 \text{ in}^2)(10179 \text{ rpm})^2=57805157673.9 \text{ in}^2 \text{ rpm}^2 \quad \text{Equation 1:}$$

$$PQ_{hpt}=(A_{hpt} \times V_{hpt}^2)=(90.67 \text{ in}^2)(24346 \text{ rpm})^2=53742622009.72 \text{ in}^2 \text{ rpm}^2 \quad \text{Equation 2:}$$

and using Equation 3 above, the ratio for the low pressure turbine section to the high pressure turbine section is:

Ratio=$PQ_{ltp}/PQ_{hpt}$=57805157673.9 in² rpm²/53742622009.72 in² rpm²=1.075

In another embodiment, the ratio is greater than about 0.5 and in another embodiment the ratio is greater than about 0.8. With $PQ_{ltp}/PQ_{hpt}$ ratios in the 0.5 to 1.5 range, a very efficient overall gas turbine engine is achieved. More narrowly, $PQ_{ltp}/PQ_{hpt}$ ratios of above or equal to about 0.8 provides increased overall gas turbine efficiency. Even more narrowly, $PQ_{ltp}/PQ_{hpt}$ ratios above or equal to 1.0 are even more efficient thermodynamically and from an enable a reduction in weight that improves aircraft fuel burn efficiency. As a result of these $PQ_{ltp}/PQ_{hpt}$ ratios, in particular, the turbine section 28 can be made much smaller than in the prior art, both in diameter and axial length. In addition, the efficiency of the overall engine is greatly increased.

Figure 11:
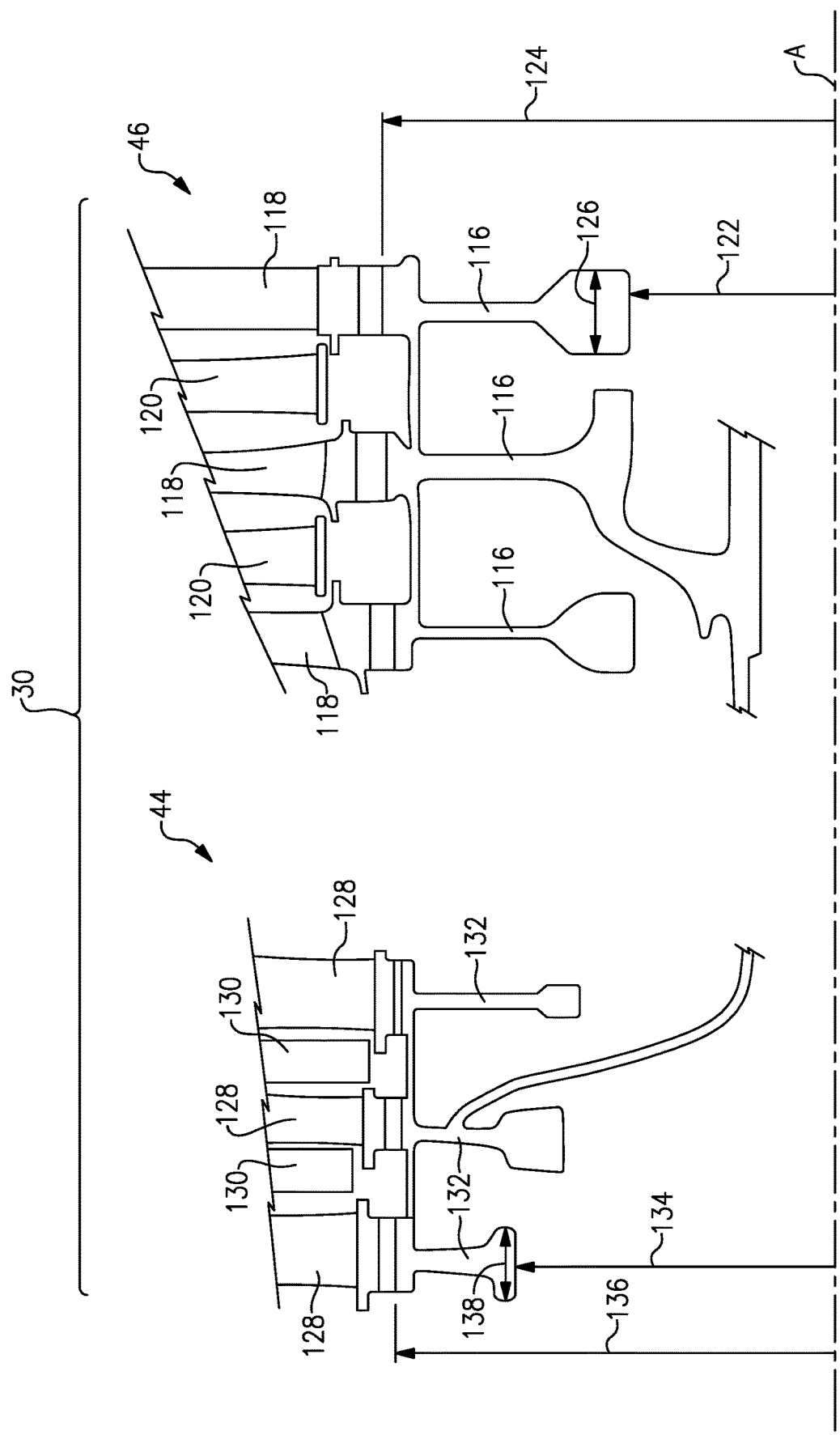
FIG. 11 is a schematic cross-section of example stages for the disclosed example gas turbine engine.

Referring to FIG. 11, portions of the low pressure compressor 44 and the low pressure turbine 46 of the low spool 30 are schematically shown and include rotors 116 of the low pressure turbine 46 and rotors 132 of the low pressure compressor 44. Each of the rotors 116 includes a bore radius 122, a live disk radius 124 and a bore width 126 in a direction parallel to the axis A. The rotor 116 supports turbine blades 118 that rotate relative to the turbine vanes 120. The low pressure compressor 44 includes rotors 132 including a bore radius 134, a live disk radius 136 and a bore width 138. The rotor 132 supports compressor blades 128 that rotate relative to vanes 130.

The bore radius 122 is that radius between an inner most surface of the bore and the axis. The live disk radius 124 is the radial distance from the axis of rotation A and a portion of the rotor supporting airfoil blades. The bore width 126 of the rotor in this example is the greatest width of the rotor and is disposed at a radial distance spaced apart from the axis A determined to provide desired physical performance properties.

Figure 12:
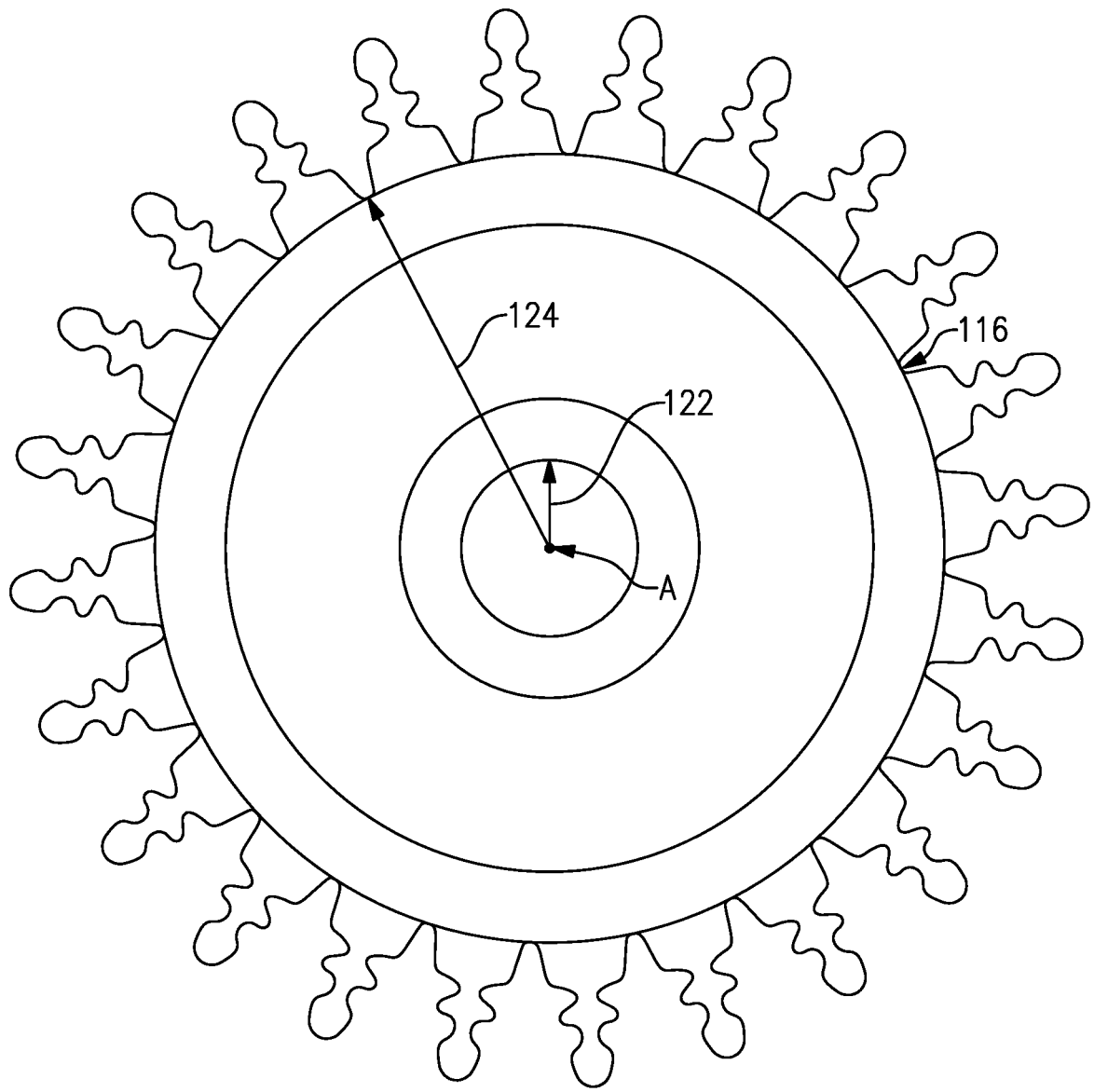
FIG. 12 is a schematic view an example turbine rotor perpendicular to the axis or rotation.

The rotors for each of the low compressor 44 and the low pressure turbine 46 rotate at an increased speed compared to prior art low spool configurations. The geometric shape including the bore radius, live disk radius and the bore width are determined to provide the desired rotor performance in view of the mechanical and thermal stresses selected to be imposed during operation. Referring to FIG. 12, with continued reference to FIG. 11, a turbine rotor 116 is shown to further illustrate the relationship between the bore radius 126 and the live disk radius 124. Moreover, the relationships disclosed are provided within a known range of materials commonly utilized for construction of each of the rotors.

Accordingly, the increased performance attributes and performance are provided by desirable combinations of the disclosed features of the various components of the described and disclosed gas turbine engine embodiments.

Figure 13:
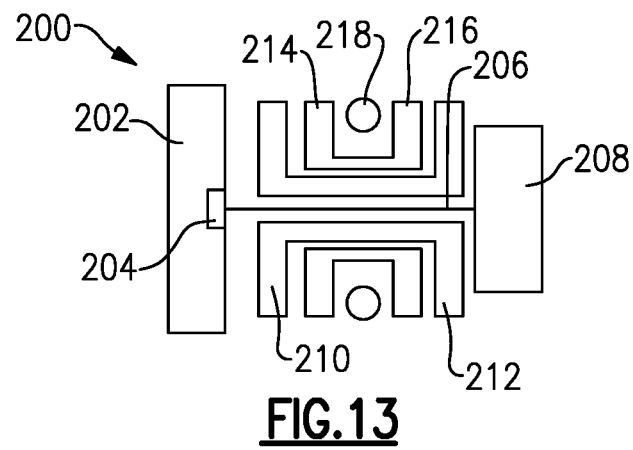
FIG. 13 is another embodiment of an example gas turbine engine for use with the present invention.

FIG. 13 shows an embodiment 200, wherein there is a fan drive turbine 208 driving a shaft 206 to in turn drive a fan rotor 202. A gear reduction 204 may be positioned between the fan drive turbine 208 and the fan rotor 202. This gear reduction 204 may be structured and operate like the gear reduction disclosed above. A compressor rotor 210 is driven by an intermediate pressure turbine 212, and a second stage compressor rotor 214 is driven by a turbine rotor 216. A combustion section 218 is positioned intermediate the compressor rotor 214 and the turbine section 216.

Figure 14:
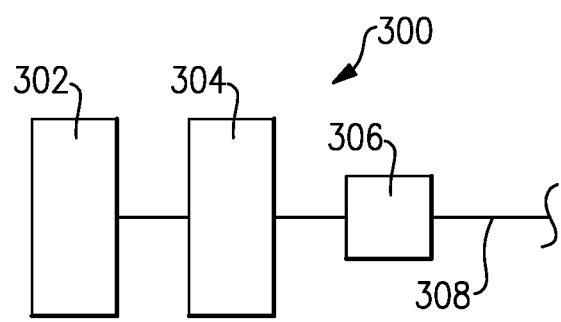
FIG. 14 is yet another embodiment of an example gas turbine engine for use with the present invention.

FIG. 14 shows yet another embodiment 300 wherein a fan rotor 302 and a first stage compressor 304 rotate at a common speed. The gear reduction 306 (which may be structured as disclosed above) is intermediate the compressor rotor 304 and a shaft 308 which is driven by a fan drive turbine.

The embodiments 200, 300 of FIG. 13 or 14 may be utilized with the features disclosed above.

Although an example embodiment has been disclosed, a worker of ordinary skill in this art would recognize that certain modifications would come within the scope of this disclosure. For that reason, the following claims should be studied to determine the scope and content of this disclosure.

The invention claimed is:

1. A gas turbine engine comprising:
a fan including a plurality of fan blades rotatable about an axis, and a low fan pressure ration across the plurality of fan blades alone of less than 1.45;
a compressor section;
a combustor in fluid communication with the compressor section;
a turbine section in fluid communication with the combustor, the turbine section including a fan drive turbine and a second turbine, wherein the second turbine is disposed forward of the fan drive turbine and the fan drive turbine includes a plurality of turbine rotors with a ratio between the number of fan blades and the number of fan drive turbine rotors is between 2.5 and 8.5; and
a speed change system configured to be driven by the fan drive turbine to rotate the fan about the axis at a different speed than the fan drive turbine;
wherein the fan drive turbine has a first exit area and rotates at a first speed, the second turbine section has a second exit area and rotates at a second speed, which is faster than the first speed, said first and second speeds being redline speeds, a first performance quantity is defined as the product of the first speed squared and the first area, a second performance quantity is defined as the product of the second speed squared and the second area, and a performance ratio of the first performance quantity to the second performance quantity is greater than 0.5, and the performance ration is less than or equal to 1.5.

2. The engine as recited in claim 1, wherein the speed change system comprises a gear reduction having a gear ratio greater than about 2.3.

3. The engine as recited in claim 2, wherein the fan drive turbine has from three to six stages.

4. The engine as recited in claim 3, wherein the fan has less than 18 of said fan blades and the second turbine has two stages.

5. The engine as recited in claim 4, further comprising a frame structure positioned between the fan drive turbine and the second turbine, and a plurality of vanes associated with the frame structure.

6. The engine as recited in claim 3, wherein the fan delivers a portion of air into a bypass duct, and a bypass ratio being defined as the portion of air delivered into the bypass duct divided by an amount of air delivered into the compressor section, with the bypass ratio being greater than 10.0.

7. The engine as recited in claim 6, wherein the fan drive turbine includes an inlet having an inlet pressure, an outlet that is prior to any exhaust nozzle and having an outlet pressure, and a pressure ratio defined as a ratio of the inlet pressure to the outlet pressure, and wherein the pressure ratio of the fan drive turbine is greater than about 5.

8. The engine as recited in claim 7, wherein the second turbine has two stages.

9. The engine as recited in claim 8, wherein the fan has less than 18 of said fan blades.

10. The engine as recited in claim 9, further comprising a low corrected fan tip speed less than about 1150 ft/second, wherein the low corrected fan tip speed is an actual fan tip speed divided by $[(Tram\ °\ R)/(518.7°\ R)]^{0.5}$, where T represents the ambient temperature in degrees Rankine.

11. The engine as recited in claim 10, wherein the performance ratio is above or equal to about 0.8.

12. The engine as recited in claim 11, wherein the performance ratio is above or equal to about 1.0.

13. The engine as recited in claim 1, wherein the performance ratio is above or equal to about 0.8.

14. The engine as recited in claim 13, wherein the performance ratio is above or equal to about 1.0.

* * * * *